United States Patent [19]

Burns et al.

[11] Patent Number: 5,645,910
[45] Date of Patent: Jul. 8, 1997

[54] FORMAZAN-CYANINE COPOLYMERS DYES FOR OPTICAL RECORDING LAYERS AND ELEMENTS

[75] Inventors: Elizabeth Gertrude Burns, Rochester; Ramanuj Goswami, Webster; Csaba Andras Kovacs, Rochester, all of N.Y.

[73] Assignee: Eastman Kodak Company, Rochester, N.Y.

[21] Appl. No.: 621,287

[22] Filed: Mar. 22, 1996

Related U.S. Application Data

[60] Provisional application No. 60/000,291, June 19, 1995.
[51] Int. Cl.⁶ .................................................. B32B 3/00
[52] U.S. Cl. .................... 428/64.1; 428/64.2; 428/64.4; 428/64.8; 428/913; 430/270.14; 430/495.1; 430/945; 369/283; 369/288
[58] Field of Search ...................... 428/64.1, 64.2, 428/64.4, 64.8, 913; 430/270.1, 270.4, 270.14, 495.1, 496, 945; 369/283, 288

[56] References Cited

U.S. PATENT DOCUMENTS

| | | | |
|---|---|---|---|
| 4,666,819 | 5/1987 | Elmasry | 430/270 |
| 4,680,375 | 7/1987 | Elmasry | 528/253 |
| 5,500,325 | 3/1996 | Chapman et al. | 430/270.16 |
| 5,547,728 | 8/1996 | Cunningham et al. | 428/64.1 |

*Primary Examiner*—Newton Edwards
*Assistant Examiner*—Elizabeth Evans
*Attorney, Agent, or Firm*—John R. Everett

[57] ABSTRACT

A copolymer comprising 70 to 100 mole percent of repeating units comprising a formazan dye radical and a cyanine dye radical. The copolymers are useful in recording layers of optical recording elements.

8 Claims, No Drawings

FORMAZAN-CYANINE COPOLYMERS DYES FOR OPTICAL RECORDING LAYERS AND ELEMENTS

CROSS REFERENCE TO RELATED APPLICATION

Reference is made to and priority claimed from U.S. Provisional Application Ser. No. US 60/000,291, filed 19 Jun. 1995, entitled FORMAZAN-CYANINE COPOLYMERS DYES FOR OPTICAL RECORDING LAYERS AND ELEMENTS.

FIELD OF THE INVENTION

The present invention relates polymers and to their use in optical recording layers and elements.

BACKGROUND OF THE INVENTION

There are many different types of optical recording elements known. In most dye-based recording layers, the mode of operation requires that the recording layer have a high absorption at the wave length of the recording laser, to maximize the energy absorbed, and the resulting marks from the write process have high reflectivity. This is achieved by having a reflective layer in back of the dye layer and ablating or fading the dye in the process of recording making highly reflective marks.

A current popular form of optical storage of information is the compact disc or CD. On these disks the digital information is stored in the form of low reflectivity marks, at the read wavelength, on an otherwise highly reflective background. This is the exact opposite of the above described optical recording materials. In this format, the optical information is most often in the form of read only memory or ROM. Optical information is not recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the reflectivity is lower than in those areas not having the deformations.

It is desirable to produce writable optical recording media which, when recorded in real time, produces a record that mimics the conventional CD on read out. In this manner, information can be added to the CD and the CD can be used on conventional CD players.

One recently disclosed system of this type is the so called "Photo CD". In this system, conventional photographic film is first processed in a conventional manner. Then, the images from the film are digitized and the digital information is recorded in a CD readable form on an optical recording material. Images can then be played back on a CD type player into a conventional television. Since a CD has a capacity for a number of digitized images that is greater than the typical roll of consumer film, it is anticipated that the user will want to add images in multiple sessions to a CD. Thus the need for recordable, CD compatible optical recording material.

One method for forming a recordable element that mimics conventional mold pressed CD elements is to provide a heat deformable support having thereon, in order, a layer of a dye that absorbs recording radiation and a reflective layer. Exposure of the recording layer through the support by the recording beam heats the recording layer to an extent that it is said that the surface of the heat deformable support just adjacent to the recording layer surface is deformed. Materials of this type are described in U.S. Pat. No. 4,940,618, European Patent Application 0,353,393 and Canadian Patent Application 2,005,520.

Commercially useful materials for elements have stringent requirements. One of these requirements is layer integrity. Since the Photo CD is a consumer product, it must be capable of withstanding extreme environments. Between the time the original images are recorded on the Photo CD and the time subsequent images are added, the CD might be handled quite extensively. The recording layer must have sufficient cohesive strength within the layer and sufficient adhesive strength between the adjacent layers to retain its integrity through the handling process. In general, all monomeric dyes have very limited cohesive and/or adhesive strengths toward the adjacent layers, especially toward the reflective layer.

In the U.S. and the European applications mentioned above, the preferred dyes for the recording layer are indoledicarbocyanine dyes. However, this type of dye has less than the desired stability and the dye layer can be separated from the reflective gold layer with very little force. Thus, there is a continuing need for optical recording materials that have the necessary optical characteristics so that they are CD compatible and yet have good adhesive and cohesive characteristics It is to the solution to this problem that the present invention is directed.

Two patents that disclose the use of polymeric dyes for optical recording are: U.S. Pat. No. 4,680,375 and U.S. Pat. No. 4,666,819. The polymeric dyes disclosed in these patents do not include metallized dyes, nor do they include copolymers of metallized dyes and cyanine dyes. The polymeric dyes of these patents do not possess the correct optical constants for compliance with CD-writable media, nor are they stabilized to light. Nor does the prior art disclose or discuss in any way the primary advantage of this invention, which is to improve the physical properties of the write layer by improving the cohesive and/or adhesive properties of the layer.

SUMMARY OF THE INVENTION

The present invention provides a A copolymer comprising 70 to 100 mole percent of repeating units according to formula I:

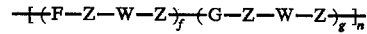  I wherein

F represents a divalent formazan dye radical derived from structure II:

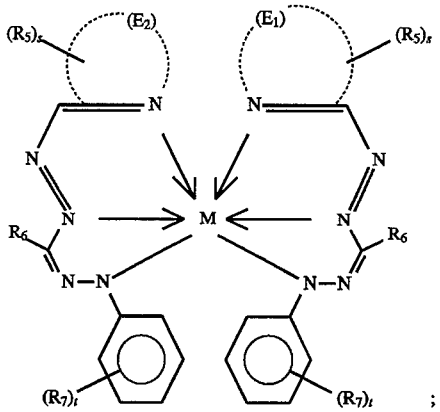

wherein $E_1$ and $E_2$ represent the atoms necessary to complete a 5- or 6-membered heterocyclic ring such as pyridine and thiazole which may bear fused aromatic rings such as phenyl or heteroaromatic rings such as pyridine, and pyrazine;

$R_5$ represents hydrogen, $C_1$-$C_{20}$ alkyl, $C_6$-$C_{10}$ aryl, $C_7$-$C_{30}$ aralkyl, heteroaryl such as pyridyl, $C_2$-$C_{20}$ alkenyl; alkoxy, $C_1$-$C_{10}$ alkoxycarbonyl, $C_6$-$C_{10}$ aryloxy, $C_6$-$C_{10}$ aryloxycarbonyl, carbamyl, sulfamoyl, $C_1$-$C_{10}$ acylamino, sulfonylamino, halogen, ureido, hydroxy, carbamoyloxy, $C_1$-$C_{10}$ alkoxycarbonylamino, nitro, cyano, thiocyano, and carboxy;

$R_6$ represents $C_1$-$C_{20}$ alkyl, heterocyclic such as pyridyl, an aromatic ring such as phenyl, $C_1$-$C_{10}$ alkoxyphenyl, $C_1$-$C_{10}$ alkylphenyl, and $C_1$-$C_{10}$ alkoxycarbonylphenyl;

$R_7$ represents a substituent defined for $R_5$ above;

M represents a complexing metal ion such as nickel, palladium, and zinc; and s and t represent integers from 0 to 4.

G represents a divalent radical derived from a cyanine dye of structure III:

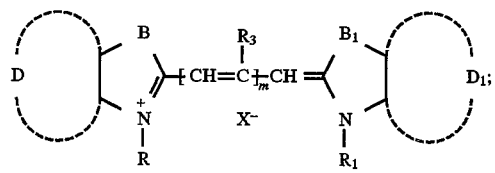

wherein

D and $D_1$ represent sufficient atoms to form a fused substituted or unsubstituted aromatic ring such as phenyl, naphthyl; and heterocyclic ring such as pyridyl;

B and $B_1$ represent —O—, —S—, >C(CH$_3$)$_2$, —Se—, —CH=CH—,

in which E represents an substituted or unsubstituted $C_1$ to $C_{10}$ alkyl and an aromatic ring such as phenyl and naphthyl; or B may combine with D, or $B_1$ may combine with $D_1$, to form fused aromatic rings;

R and $R_1$ represent $C_1$ to $C_{10}$ alkyl and $C_7$ to $C_{20}$ arylalkyl such as benzyl and phenethyl;

$R_3$ represents hydrogen, $C_1$ to $C_{10}$ alkyl, $C_7$ to $C_{20}$ arylalkyl such as benzyl and phenethyl; and halogen such chlorine and bromine;

X represents a anionic counter ion selected from

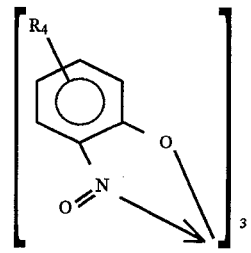

$R_4$ represents hydrogen, $C_1$ to $C_{10}$ alkyl, $C_1$ to $C_{10}$ alkoxy, and halogen such as chlorine, bromine and fluorine; $R_4$ represents the atoms necessary to form a fused aromatic ring;

m represents an integer from 1 to 2.

W represents $C_2$-$C_{18}$-alkylene; $C_3$-$C_8$-cycloalkylene; $C_1$-$C_4$ alkylene bonded to $C_3$-$C_8$ cycloalkylene bonded to $C_1$-$C_4$ alkylene; $C_1$-$C_4$ alkylenearylene bonded to $C_1$-$C_4$ alkylene; $C_2$-$C_4$ alkoxy bonded to $C_2$-$C_4$ alkylene; arylene bonded to $C_1$-$C_4$ alkylene bonded to arylene; and $C_3$-$C_8$ cycloalkylene bonded to $C_1$-$C_4$-alkylene bonded to $C_3$-$C_8$ cycloalkylene;

Z represents a divalent radical derived from carbonate, urethane, urea, ester; or amide;

f represents 10 to 65 mole percent of the repeating unit and g represents the remainder of the repeating unit;

n represents the repeating units needed to build a copolymer chain of a size that corresponds to a polymethylmethacrylate chain of weight average molecular weight ($M_W$) of 5,000 to 1,000,000.

The present invention also provides optical recording layers containing such copolymers and optical recording elements containing the layers.

In optical recording elements the copolymers of the invention improve light stability and the adhesive properties between the recording layer and other layers of an optical recording element. The improved light stability and adhesion provided by the copolymers are especially useful in Photo CD optical recording elements between the reflective layer and the recording layer and between the recording layer and the substrate.

DETAILS OF THE INVENTION

Weight average molecular weights of the polymers of the invention are determined by size exclusion chromatography (SEC) in dimethylformamide containing 0.01M LiNO$_3$ using three 10 μm PLgel mixed-bed columns. The column set was calibrated with narrow-molecular-weight distribution polymethylmethacrylate standards between 500 (log M=2.70) and 2,750,000 (log M=6.44) daltons. Results are calculated as polymethylmethacrylate equivalent molecular weights.

The useful molecular weight range of the copolymeric dyes is from 5,000 to 1,000,000. Below the lower end of this range the oligomers are expected to have monomeric characteristics. Above the higher end of this range, it is predicted that the viscosity of the copolymers will be too high to give acceptable coatings.

The copolymers of the invention also include copolymers in which divalent dye radicals and/or the connecting units are outside the definition of Structure I. Such copolymers comprise 0 to 30 mole percent of these divalent dye radicals. The copolymer may also contain repeating units according to the invention and up to 30 mole percent repeating units that do not include any dye radicals.

Repeating units other than the dye radicals may be prepared from 1,2-ethanediol, 1,3-propanediol, 1,2-propanediol, 3-methoxy-1,2-propanediol, 3-(dimethylamino)-1,2-propanediol,2,2-dimethyl-1,3-propanediol, butanediol, pentanediol, hexanediol, heptanediol, octanediol, 1,3-cyclohexanediol, 1,4-cyclohexanediol, 1,4-cyclooctanediol, 1,5-decalindiol, di(ethyleneglycol), tri(ethyleneglycol),hexa(ethyleneglycol), di(propyleneglycol), tri(propyleneglycol), 1,2-ethanediamine, 1,3-ethanediamine, 1,2-ethanediamine, butanediamine, pentanediamine, hexanediamine, heptanediamine, octanediamine, 1,3-cyclohexanediamine, 1,4-hexanediamine, 1,3-phenylenediamine, 1,4-phenylenediamine, 4,5,10-trioxa-1,13-tridecanediamine and piperazine.

In general the copolymers are prepared by converting the relevant dye compounds into diol or diamine monomers. The monomers are then converted into copolymers using well known copolymerization procedures. Cyanine and formazan dyes from which monomers suitable for copolymerization can be prepared from a number of well known prior methods. The following dye, monomer and copolymerization are examples of such known prior art chemical preparation methods.

Synthesis of formazan monomer used copolymers E34, E35, E36, E37 of table 1, infra.

Potassium carbonate (24.0 g, 173.9 mmol) was added to an ethanolic solution containing salicylaldehyde (19.0 g, 155.7 mmol) an allyl bromide (22.0 g, 181.8 mmol). The resulting suspension was heated to reflux overnight. The precipitated inorganic salt was filtered off. The filtrate was evaporated under reduced pressure to give the desired product, 2-allyloxy-benzaldehyde.

To a suspension containing 5-nitro-2-hydrazinopyridine (15.5 g, 100.6 mmol) in ethanol (250 mL), 2-allyloxy-benzaldehyde (17.0 g, 105 mmol) was added. The resulting mixture was heated to reflux for 3 hours. The reaction mixture was cooled to room temperature. Water and ice were added to precipitate the product. The desired product was collected by filtration, and was washed with cold ethanol, and was dried. Ice and 6N hydrochloric acid were added to 4-aminophenethyl alcohol (7.5 g, 54.7 mmol). This suspension was cooled using and ice bath. To this cold suspension, a solution of NaNO2 (6.3 g, 91.3 mmol) in 15 mL water was added in one portion. This resulting suspension was stirred, keeping the temperature below 5° C. until all solid dissolved (about 30 min.). Urea was added to destroy any excess nitrous acid present.

The hydrazone from the above reaction (9.0 g, 30.2 mmol) and nickel (II) acetate tetrahydrate (3.75 g, 15.1 mmol) was dissolved with sonication in 500 mL of a 1:1 mixture of methanol and N,N-dimethylformamide (DMF). The resulting solution was cooled using and ice-bath. Sodium acetate (40.0 g, 487.8 mmol) was added to this brown solution. The dizonium solution prepared above was slowly added in portions to this cold dark brown solution with vigorous stirring. Immediate cyan color was noticed. Additional amounts of DMF were added to ensure the unreacted hydrazone remained in solution; the total reaction volume was about 550 mL. The reaction mixture was allowed to come to room temperature with stirring over two hours. Glacial acetic acid (75 mL) was added to the room temperature reaction mixture, and this was allowed to stir overnight. The next morning, ice (300 g) and water (150 mL) were added to the reaction mixture, and stirring was continued until the ice melted. A precipitate formed, which was collected by filtration. The solid was extracted with dichloromethane, leaving behind insoluble inorganics. The filtrate was evaporated, and the residue triturated with 3A alcohol to obtain solid material. The resulting solid was collected by filtration, washed with ethanol and water, and dried, to give 7.0 g (48.8%) of the desired dye. UV/vis spectrophotometry (in dimethylacetamide) $l_{max}$=646 nm, e=6.47×10$^4$. Field-desorption mass-spectometry showed a parent ion at 948 m/z.

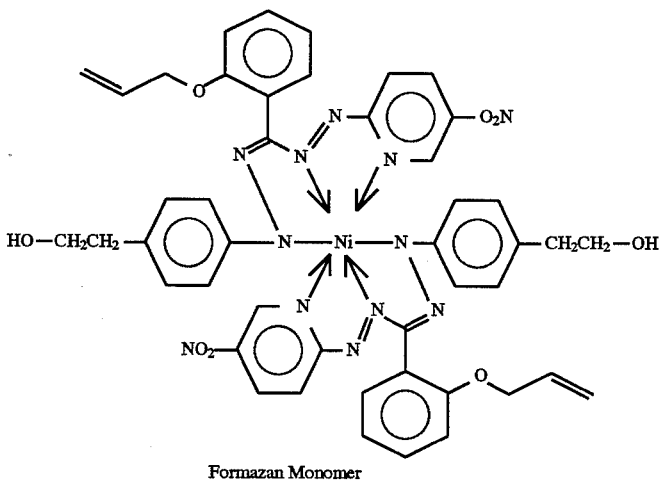

Formazan Monomer

Synthesis of the cyanine monomer used in copolymers E1, E4, E7, E9, E11, E23, E24, E25, E29, E36 and E37 of Table 1, infra.

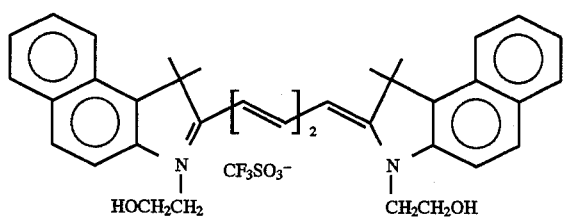

Cyanine Monomer 2,3,3-trimethyl-(3H)-benz(e)indole (200 g, 10 1.26 moles) and 2-bromoethanol (500 g, 4 moles) were heated, with stirring, to 100° C. for 24 hrs. The reaction mixture was cooled to 50° C. and poured into 2 L stirring isopropanol. Crystals began to appear after thirty minutes; the mixture was allowed to stir overnight. The crystalline solid was filtered and dried. The quat. salt (50 g) was dissolved in 2 L pyridine and the solution brought to reflux. Trimethoxypropene was added from an addition funnel in a steady stream. The reaction mixture was allowed to reflux 15 minutes after the addition, then cooled to room temperature and poured into 16 L stirring ethyl acetate. After stirring for an hour the slurry was left to settle overnight then filtered, washed with 1 L ethyl acetate and dried in a vacuum oven overnight yielding 41 g crude product. The crude product was combined with 1L 3/1 isopropanol and water and refluxed for thirty minutes then cooled to room temperature. 1 L water was added to precipitate the product which was collected by filtration and dried in a vacuum oven overnight.

The bromide salt, (2.3 g) was slurried in 50 mL methanol and brought to reflux. 3 mL trifluoromethylsulfonic acid was added dropwise to the refluxing slurry. The heat was removed as soon as addition was complete and the mixture was allowed to cool to room temperature. Water (100 mL) was added to the room temperature mixture, and the mixture was filtered to collect the desired salt. The filtrate was washed with water and dried in a vacuum oven overnight.

EXAMPLE 1

Synthesis of copolymer E1

Monomers were made according to the procedures described above. The cyanine monomer, 1.49 g, 2.22 mmoles and the formazan monomer 0.727 g, 0.742 mmoles were dissolved in 8 mL dimethylacetamide, to which was added 0.48 mL (2.966 mmoles) hexamethylene diisocyanate and 20 μl of dibutyltindilaurate. The solution was heated to 70 ° C. with agitation for 14 hours, cooled, and precipitated into 500 mL water. The resulting dark-colored solid polymer was collected via filtration, rinsed with isopropyl alcohol and dried in vacuo, yielding 2.41 g, (89%). Size-exclusion chromatography indicated an $M_W$ of 35,600 relative to poly(methylmethacrylate) standards, with a mobile phase of 0.01M $LiNO_3$ in dimethyl formamide. UV-vis spectroscopy showed the presence of both chromophores, and linear-regression fitting of the two homopolymer curves to the copolymer curve indicated the composition predicted by feed ratios.

Synthesis of cyanine dye monomer used in copolymers E10 and E26 of Table 1, infra.

2,3,3-trimethyl-(3H)-benz(e)indole (200 g, 1.26 moles) and 2-bromoethanol (500 g, 4 moles) were heated, with stirring, to 100° C. for 24 hrs. The reaction mixture was cooled to 50° C. and poured into 2 L stirring isopropanol. Crystals began to appear after thirty minutes; the mixture was allowed to stir overnight. The crystalline solid was filtered and dried. The dried quat salt 112 g was dissolved in 250 mL distilled water and filtered to remove insolubles. Sodium tetrafluro borate (112 g) was dissolved in 250 mL water and filtered to remove insolubles. The sodium tetrafluroborate solution was added to the stirring quat salt solution in a thin stream. A precipitate formed, and was collected by filtration and dried.

EXAMPLE 2 synthesis of copolymer E10 of Table 1, infra.

Monomers were made according to the procedures described above. The cyanine monomer, 1.50 g, (2.38 mmoles) and the formazan monomer 0.75 g, (0.79 mmoles) were dissolved in 8 mL dimethylacetamide, to which was added 0.51 mL (3.17 mmoles) hexamethylene diisocyanate and 20 μl of dibutyltindilaurate. The solution was heated to 70° C. with agitation for 14 hours, cooled, and precipitated into 500 mL water. The resulting dark-colored solid polymer was collected via filtration, rinsed with isopropyl alcohol and dried in vacuo, yielding 2.7 g, (97%). Size-exclusion chromatography indicated an $M_w$ of 60,500 relative to poly(methylmethacrylate) standards, with a mobile phase of 0.01M $LiNO_3$ in dimethyl formamide.

Table 1 presents a portion of the representative copolymers of this invention. In the table the substituent "sBu" refers to secondary butyl. Also in the copolymer structures presented in the table the divalent dye component of the repeating unit, and its relative fraction in the repeating unit is presented in the center of the structure under each such component. Where the polymer includes more than one linking group the relative fraction in the repeating unit is presented also in the center of the structure under each linking group. As presented the total dye component should total 1.0 and the total linking group component should total 1.0. In the case where no number is indicated for the linking group the number is understood to be 1 representing a linking group for each dye group.

TABLE 1
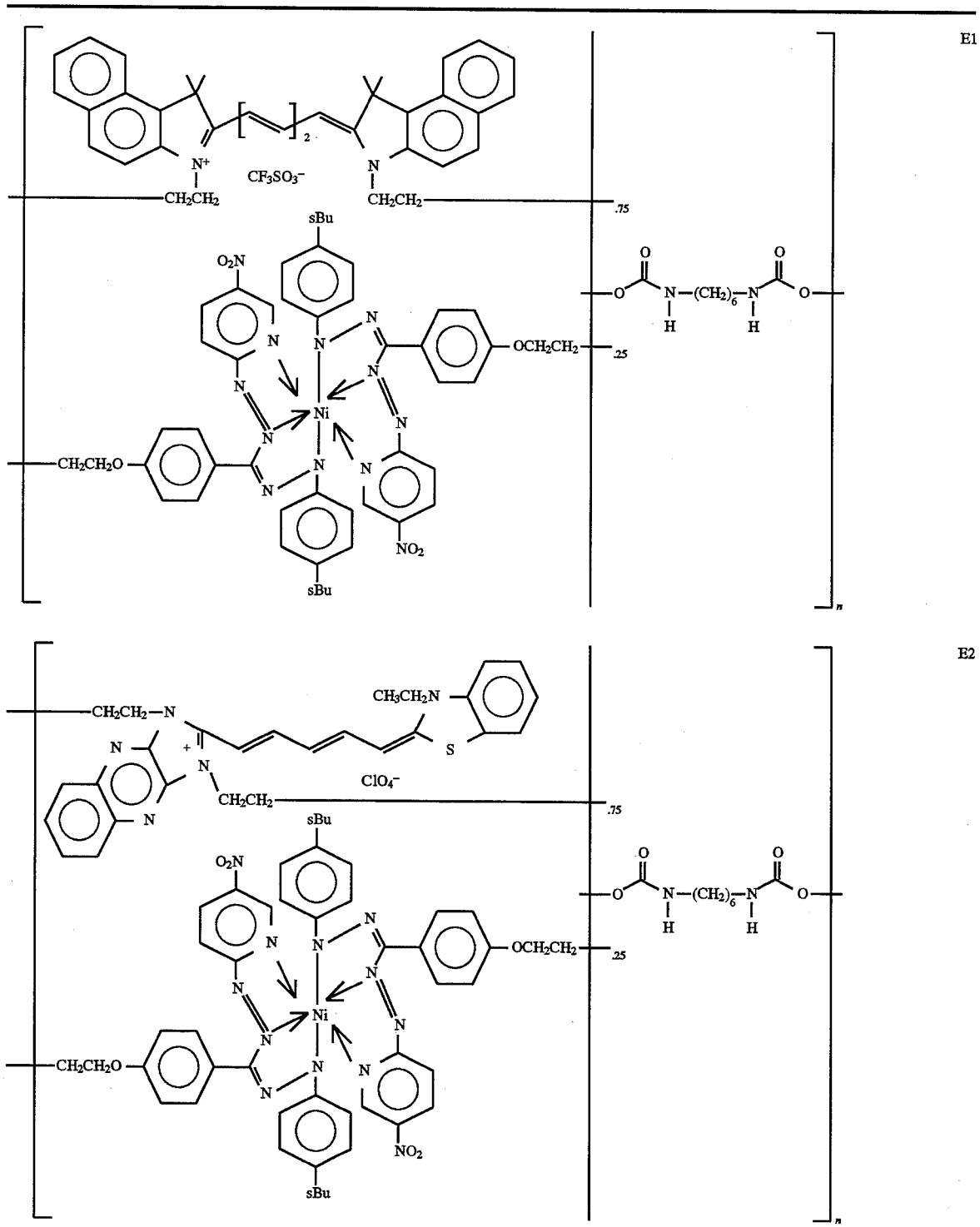

TABLE 1-continued
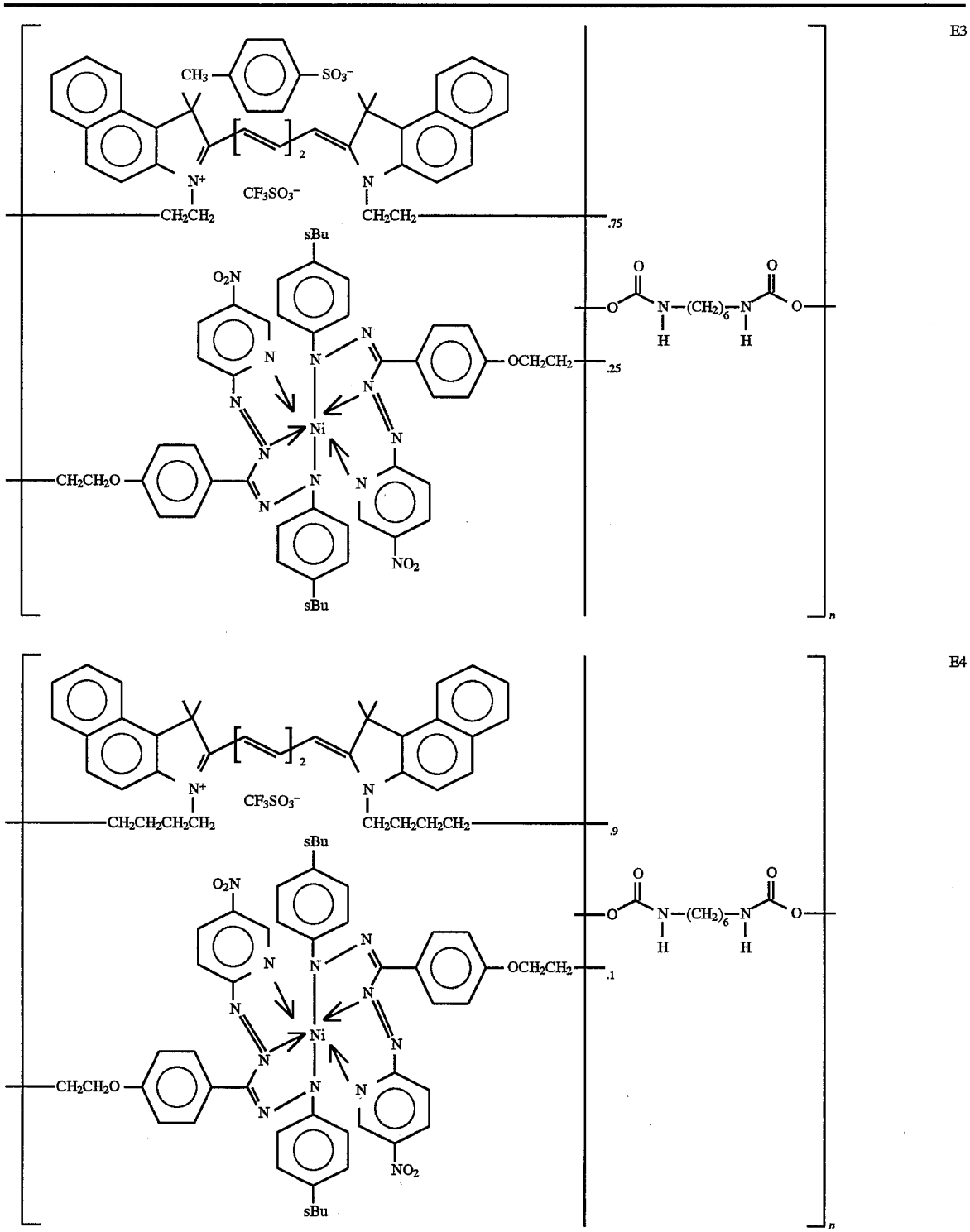

TABLE 1-continued
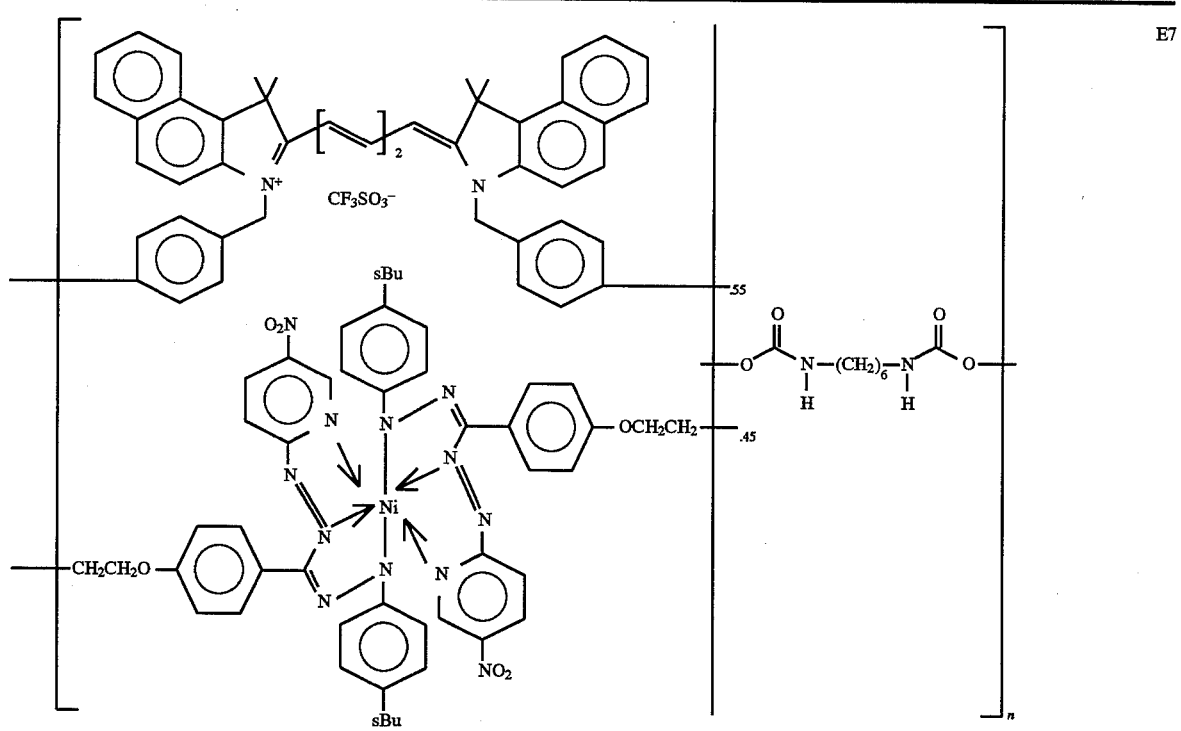
E7
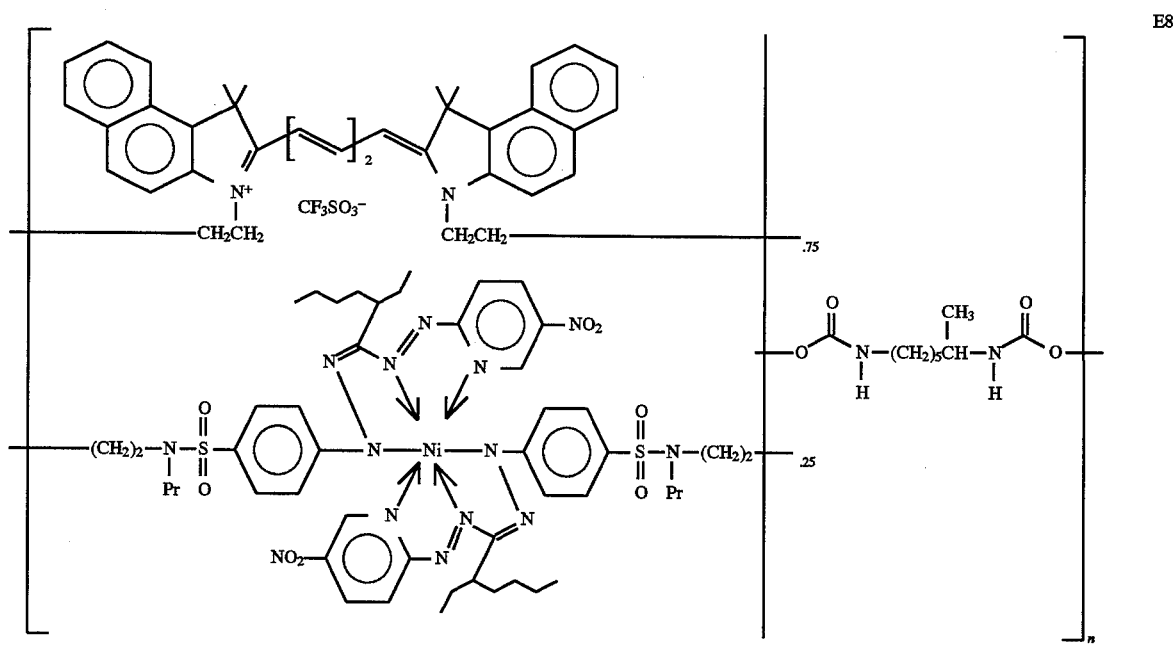
E8

TABLE 1-continued
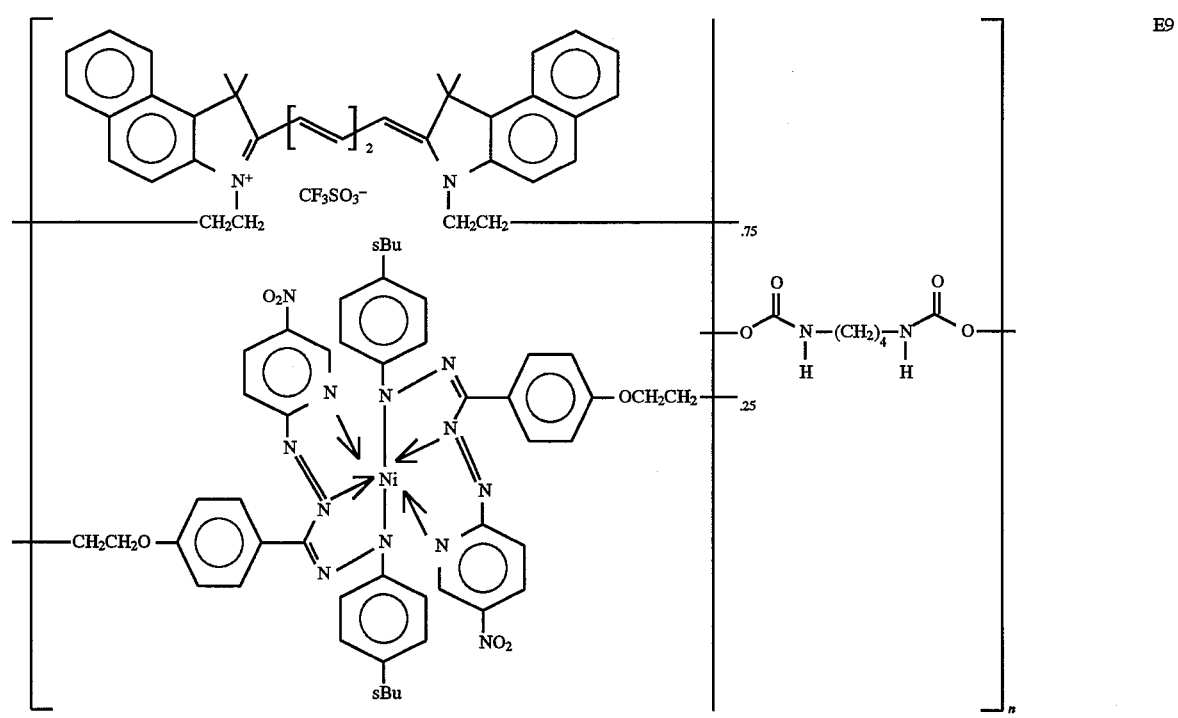
E9
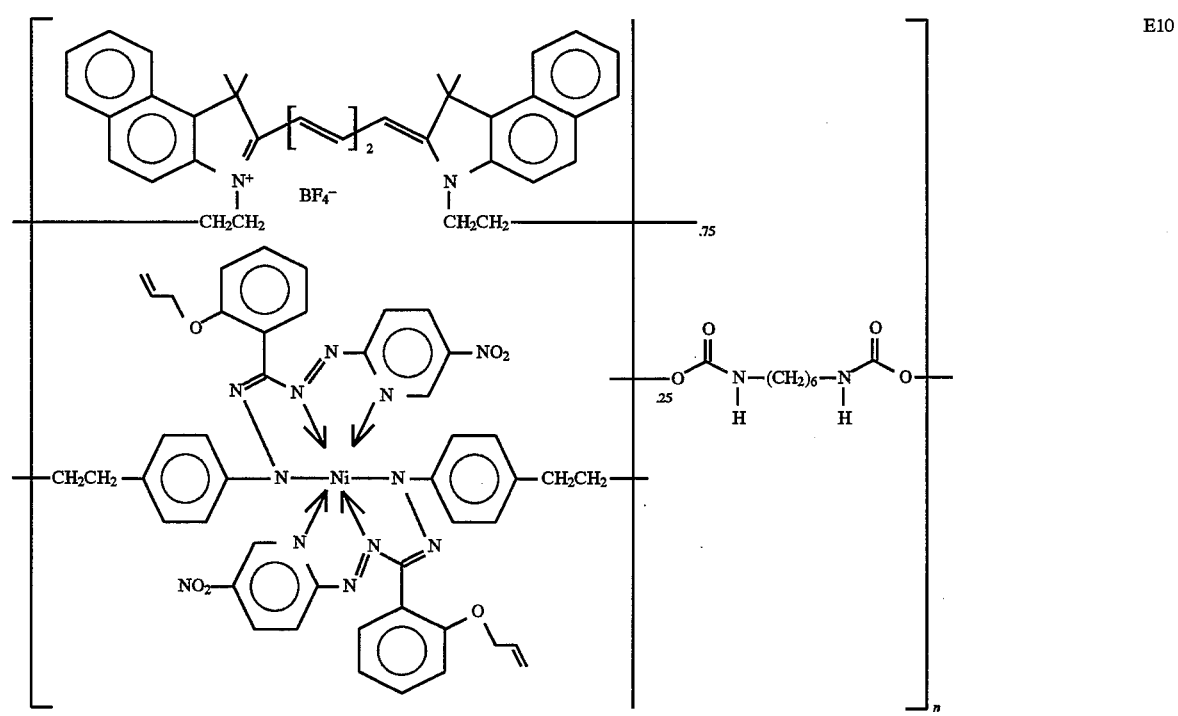
E10

TABLE 1-continued
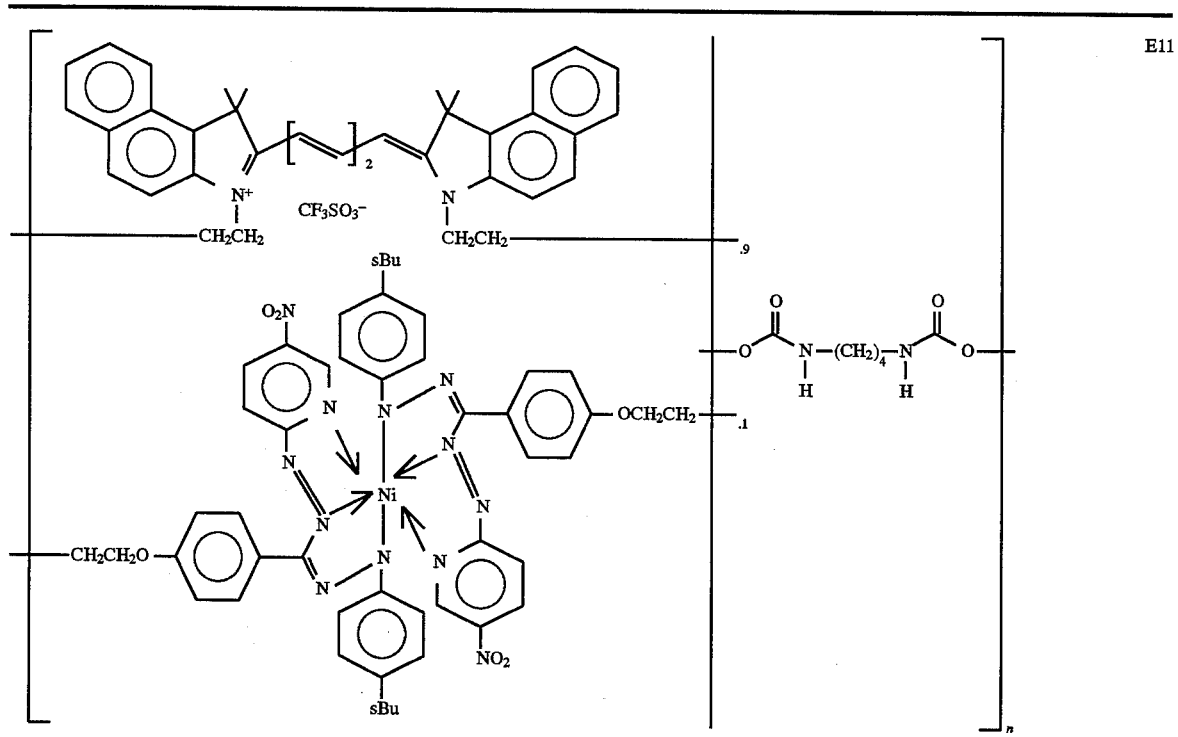
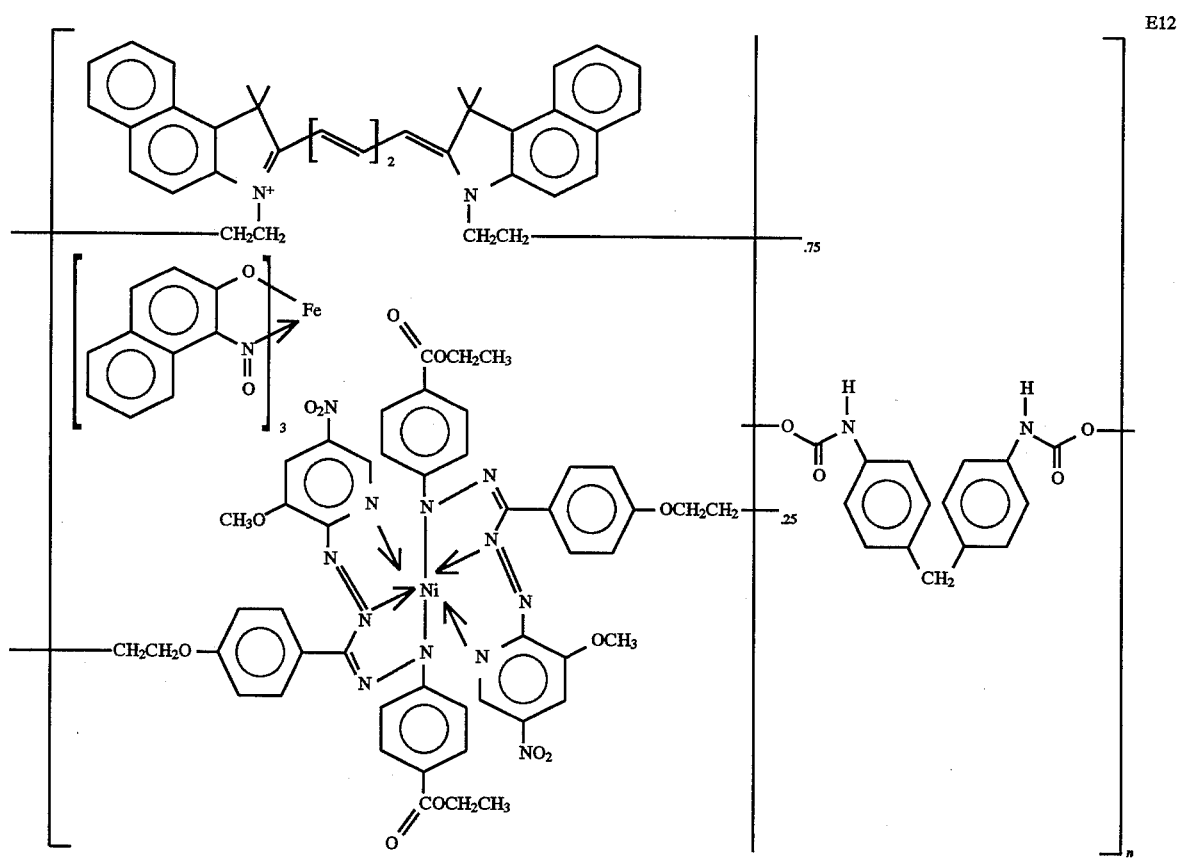

TABLE 1-continued
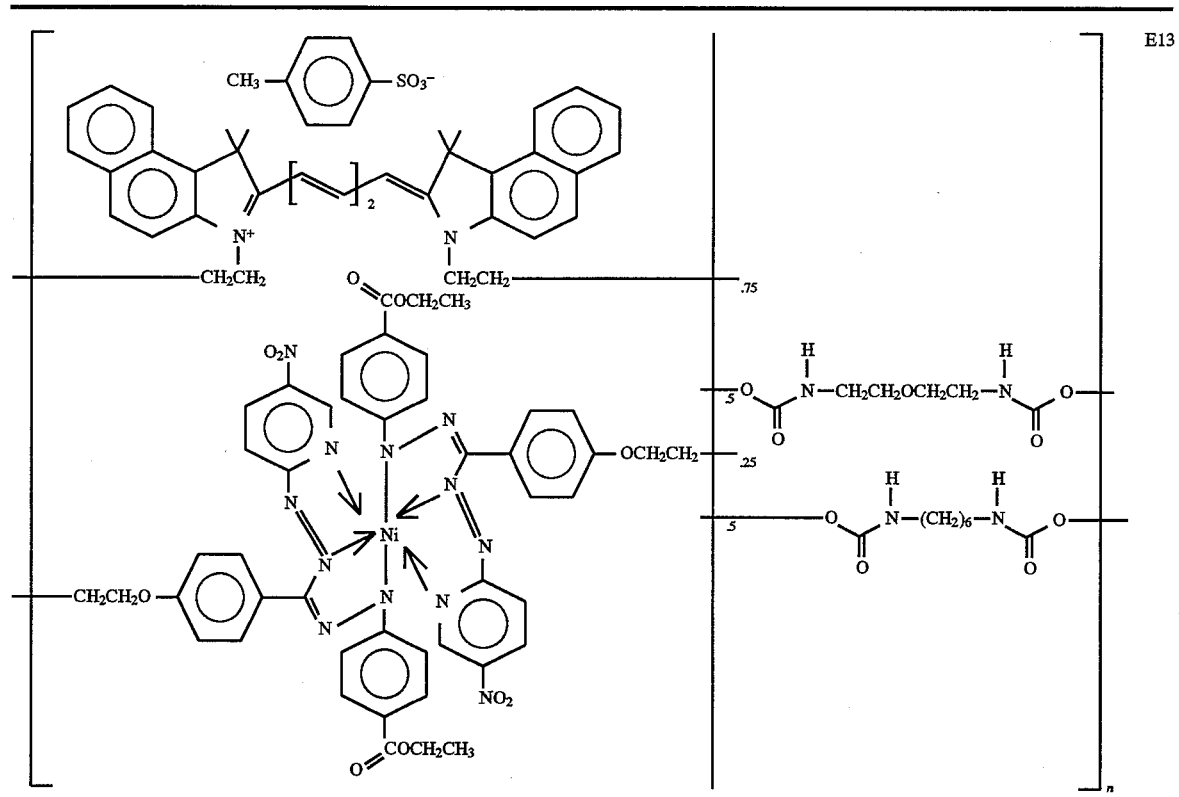
E13
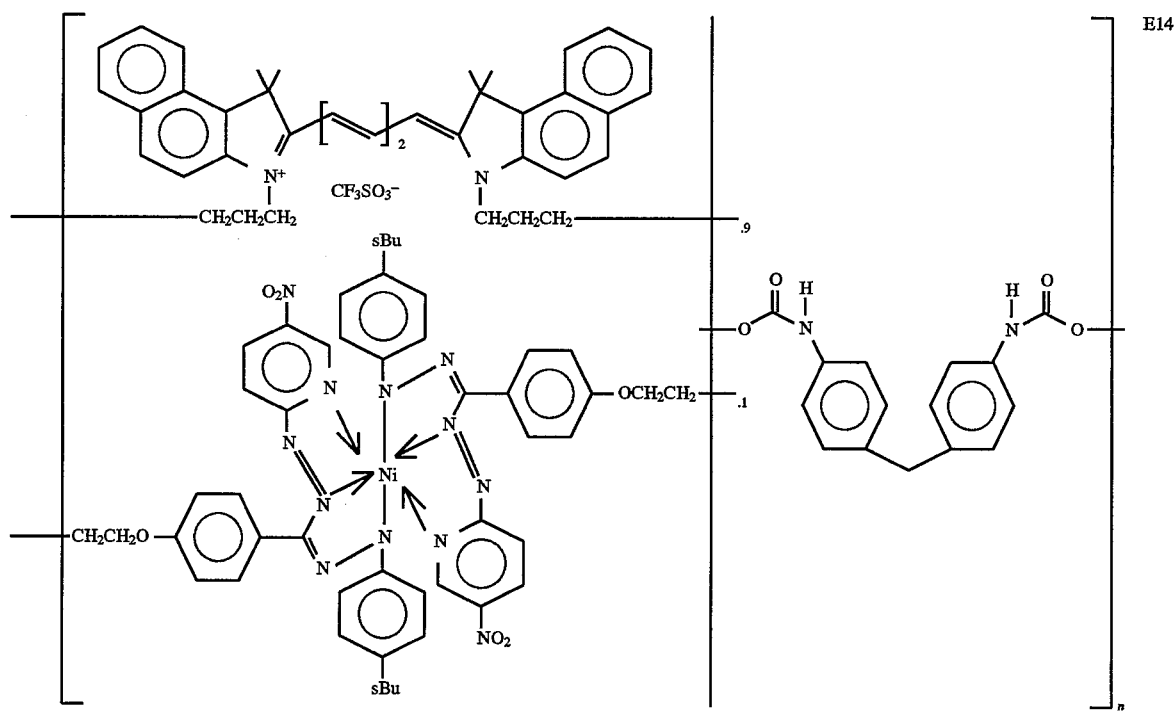
E14

TABLE 1-continued
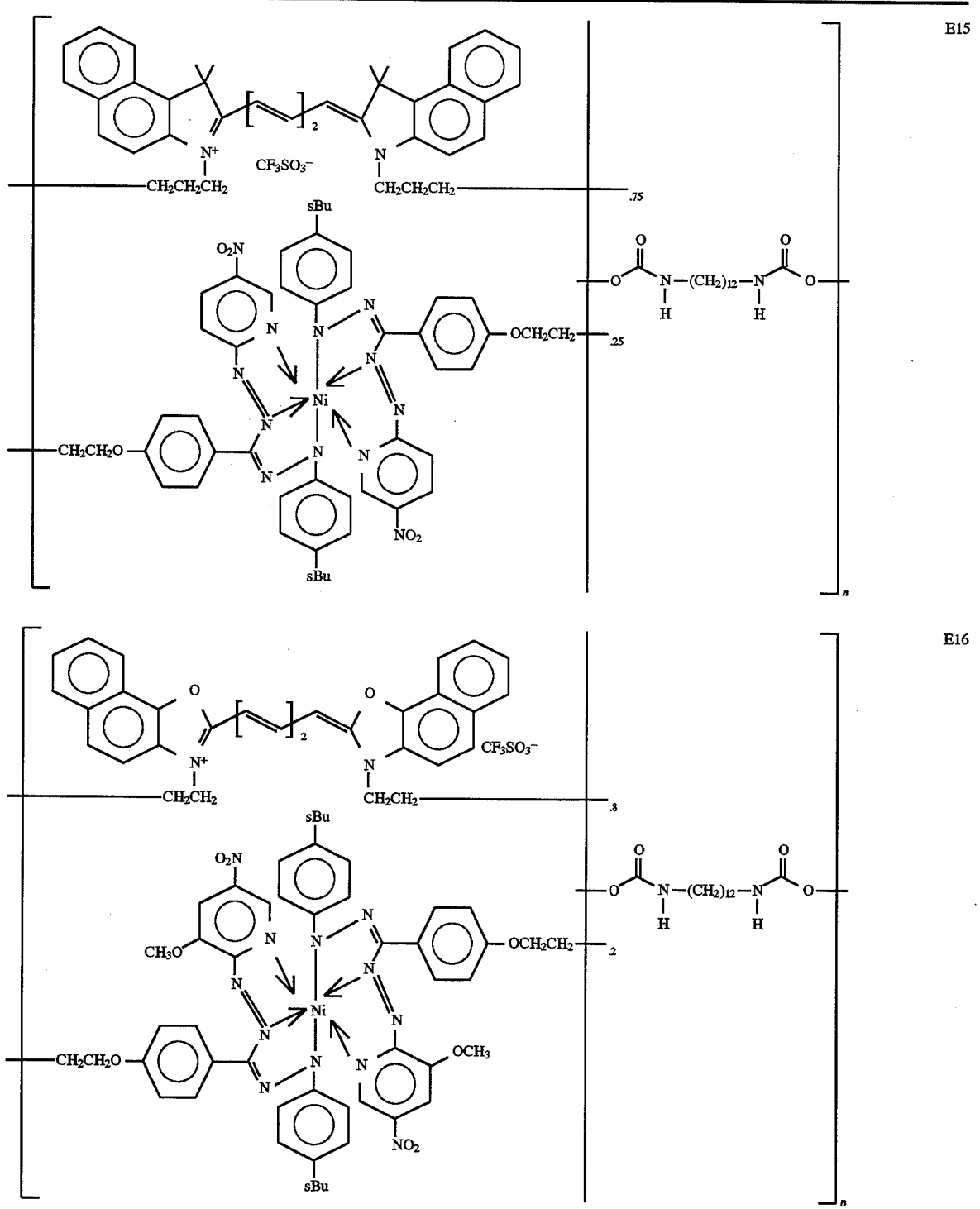

TABLE 1-continued
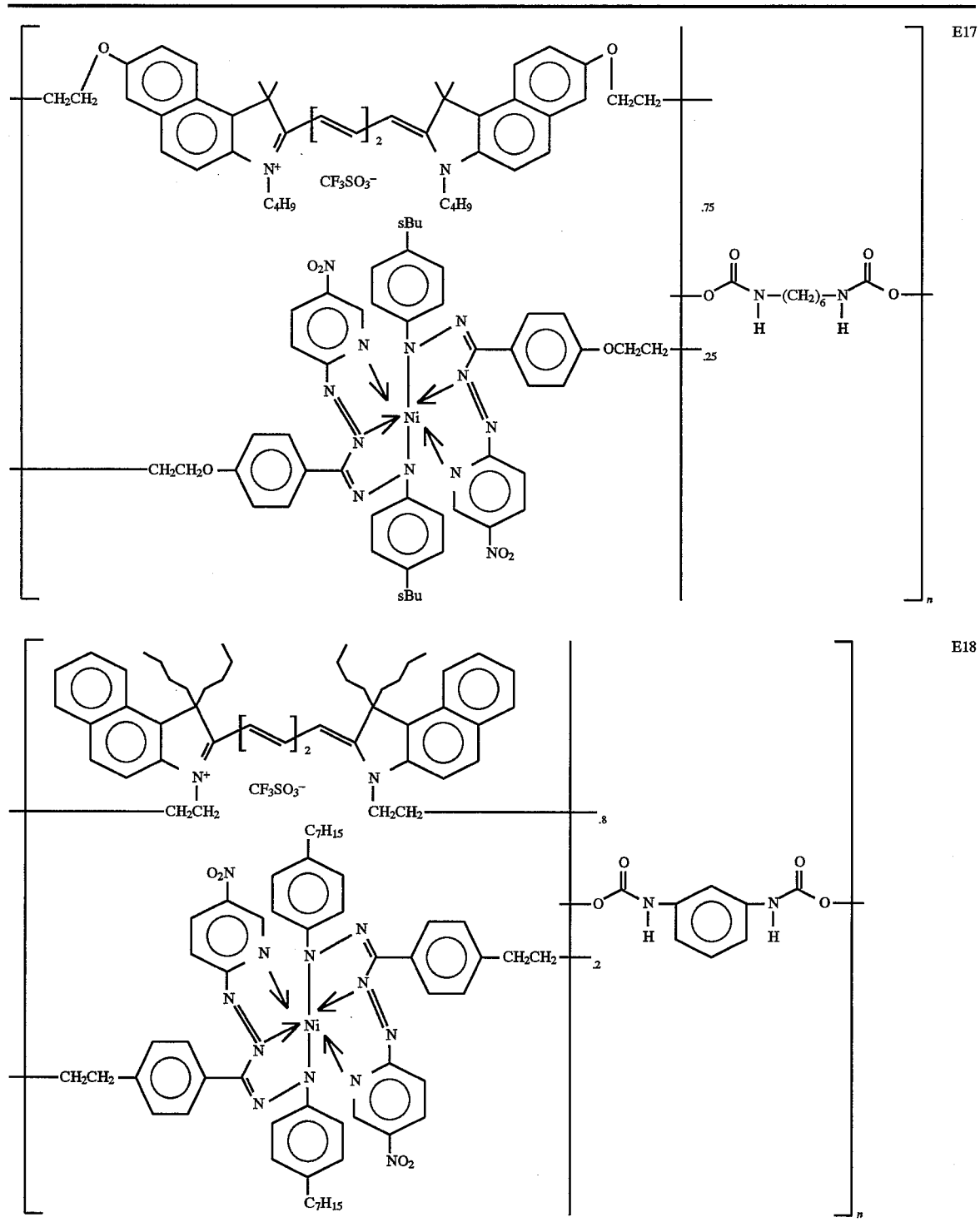

TABLE 1-continued
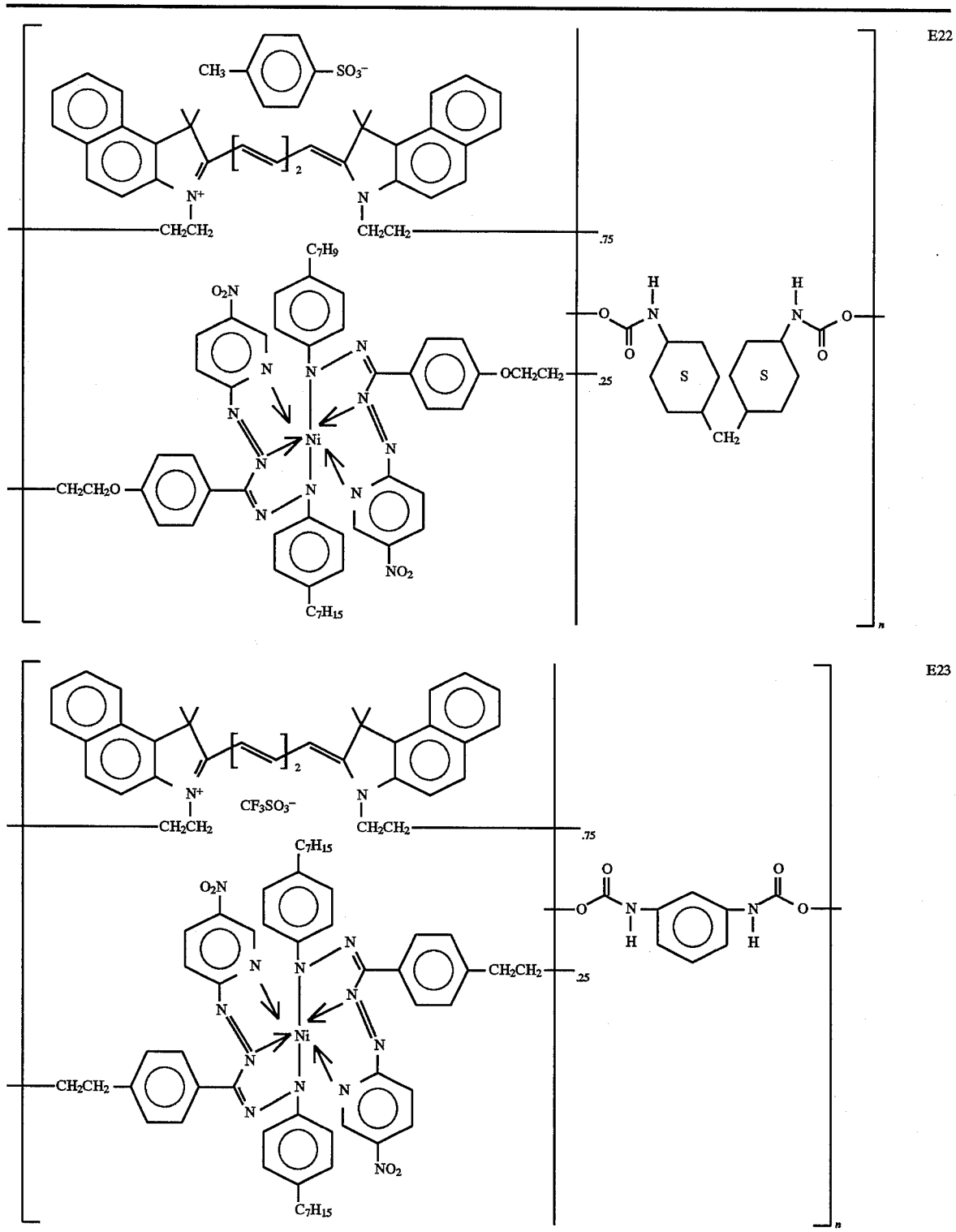

TABLE 1-continued
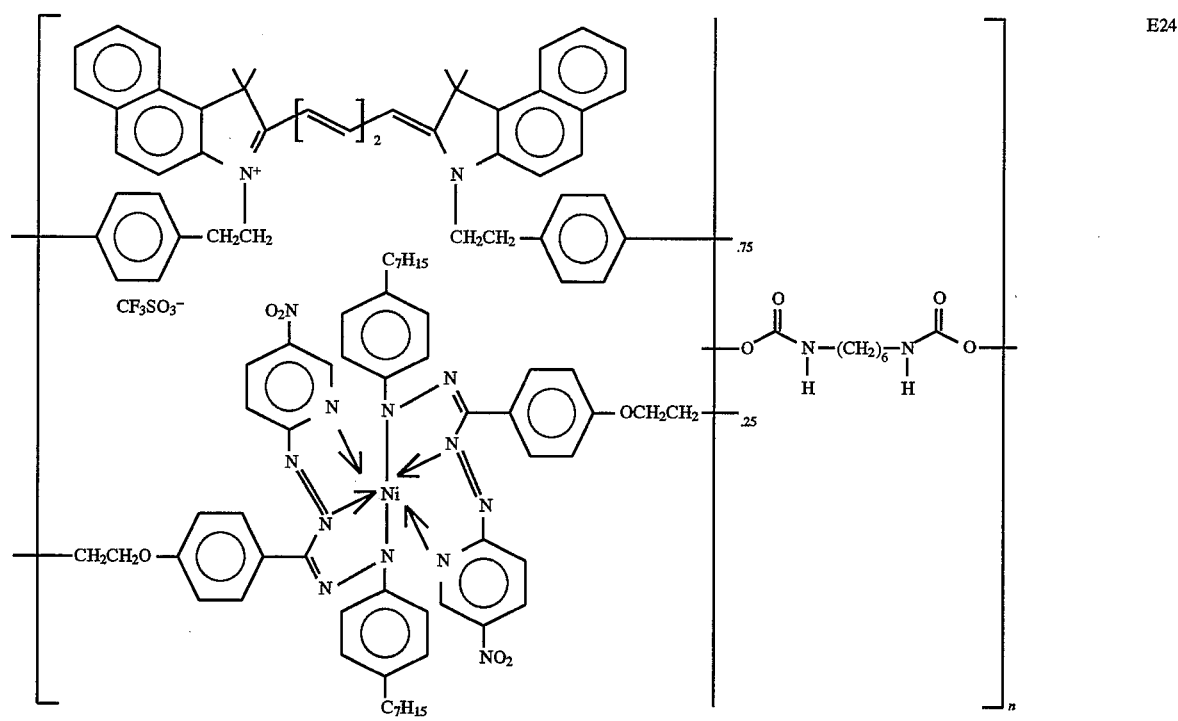
E24
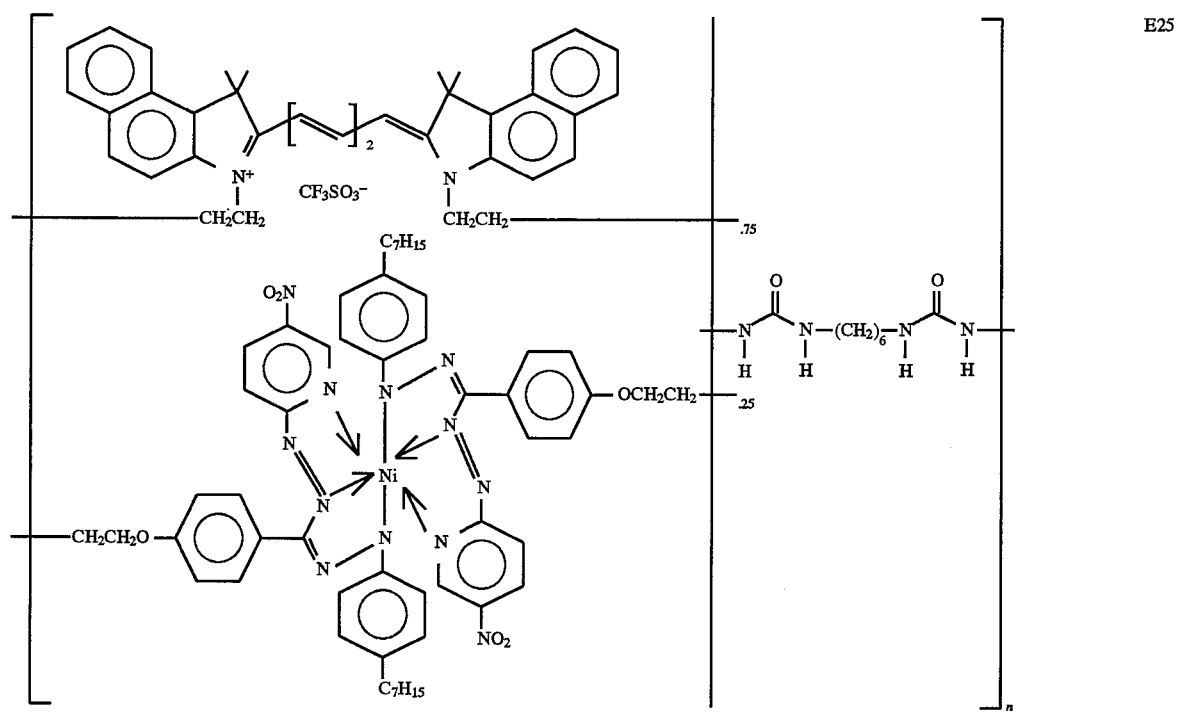
E25

TABLE 1-continued
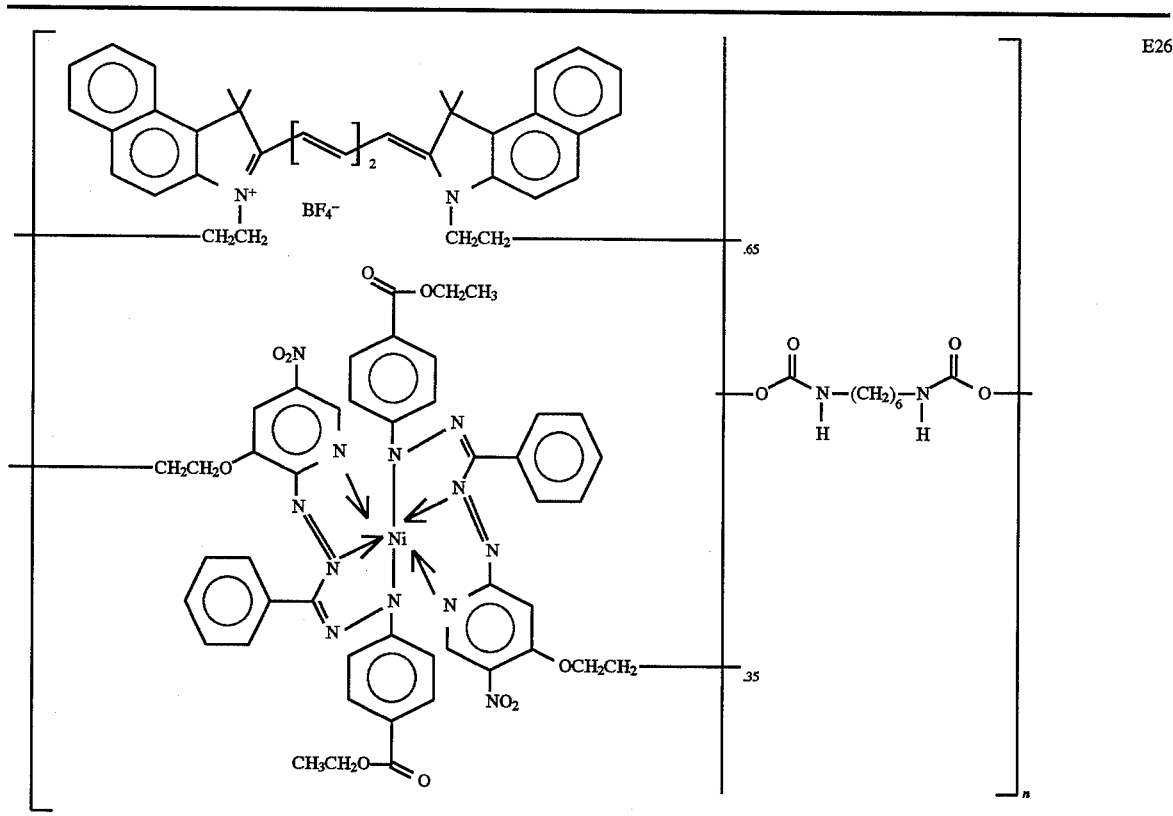 E26
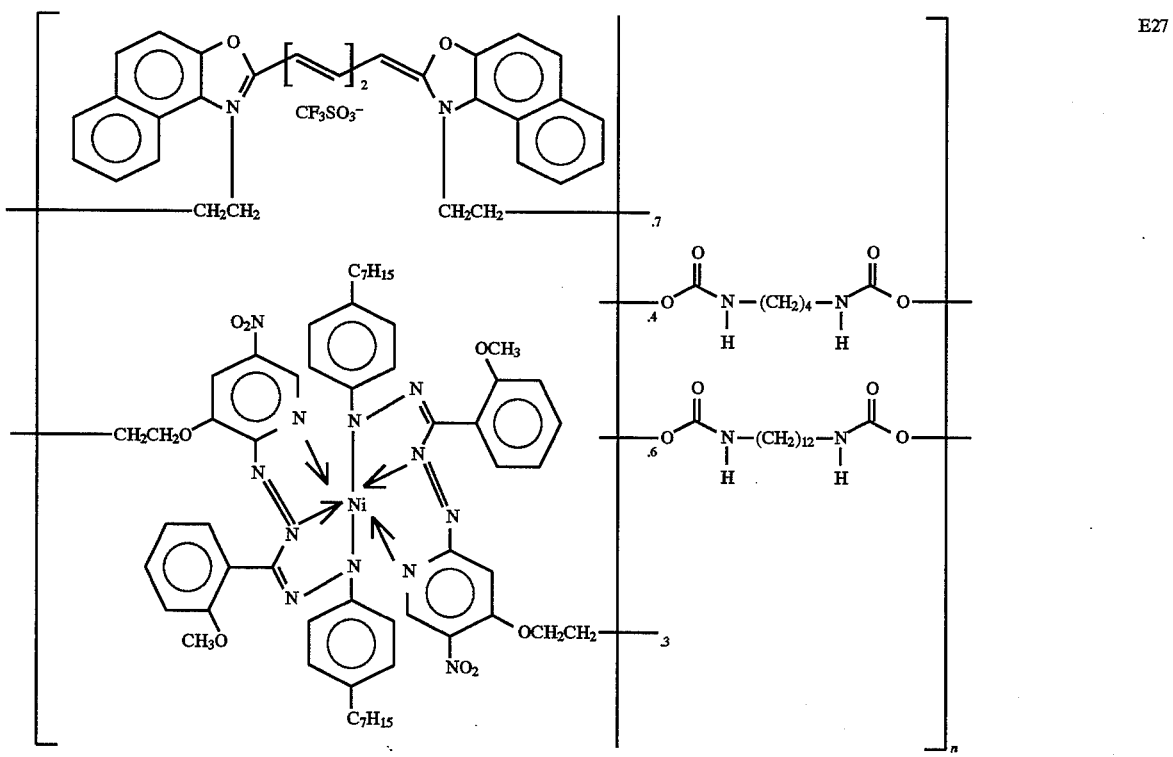 E27

TABLE 1-continued
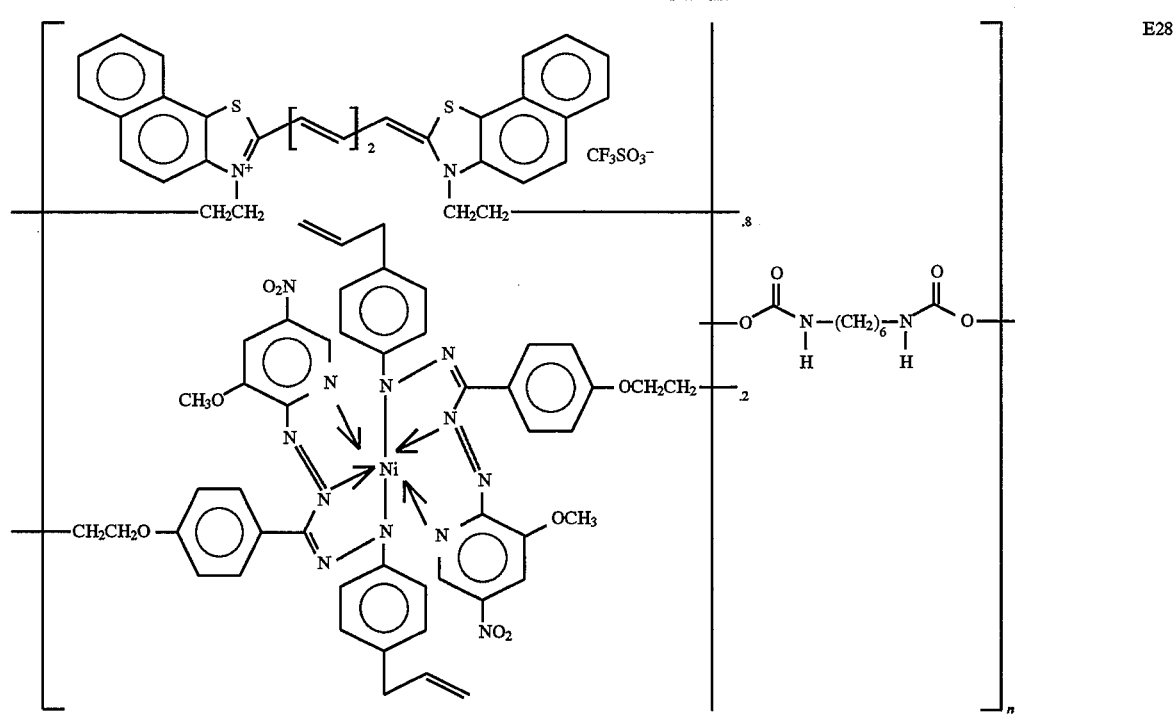
E28
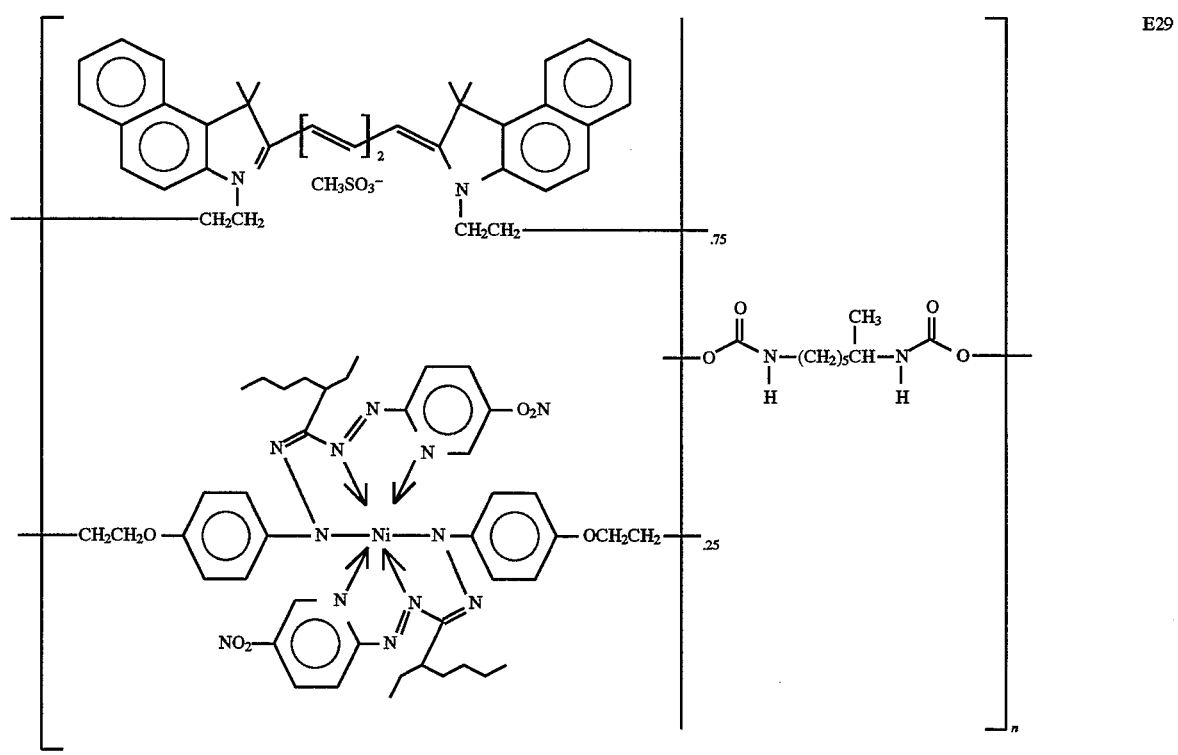
E29

TABLE 1-continued
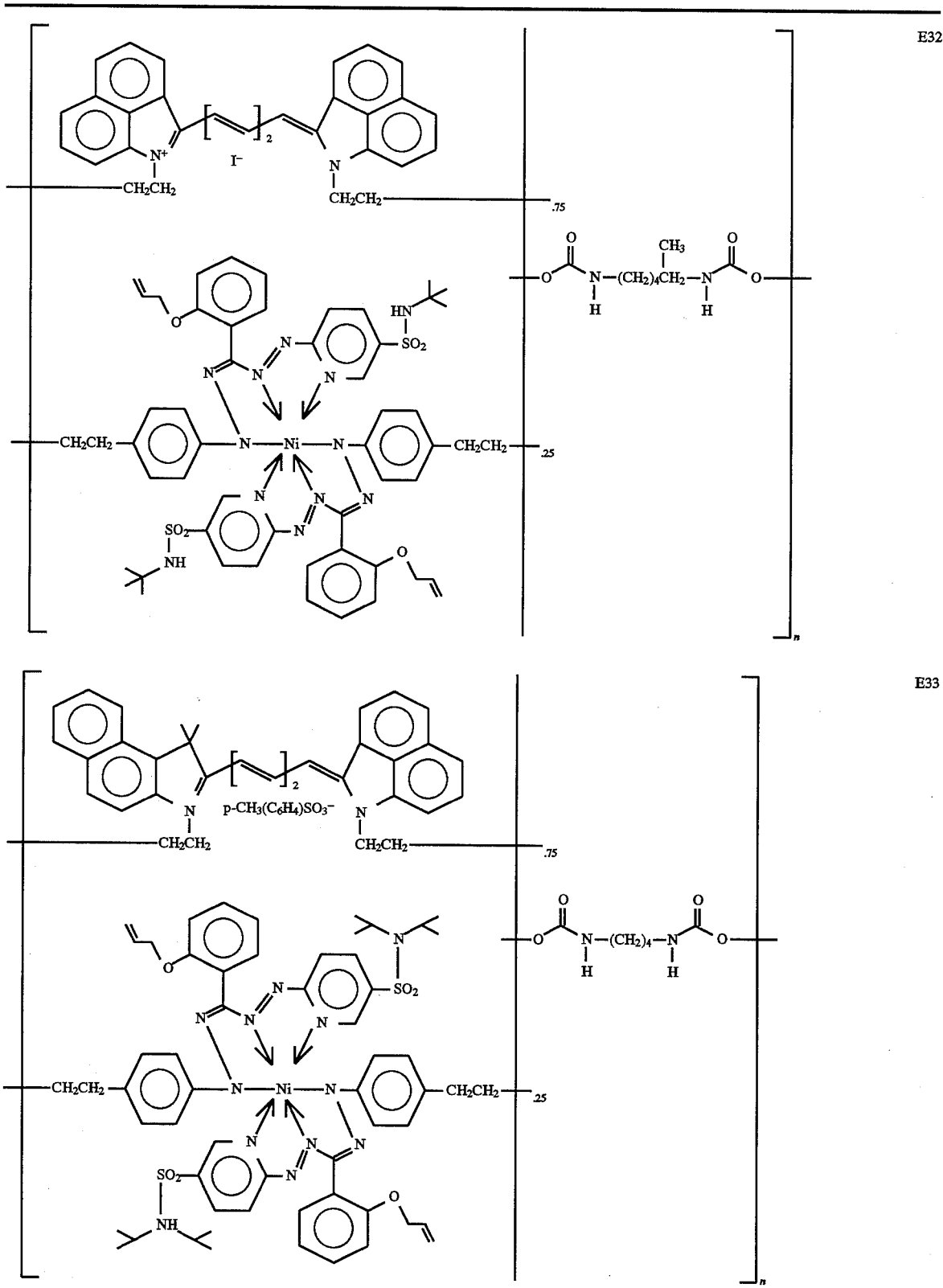

TABLE 1-continued
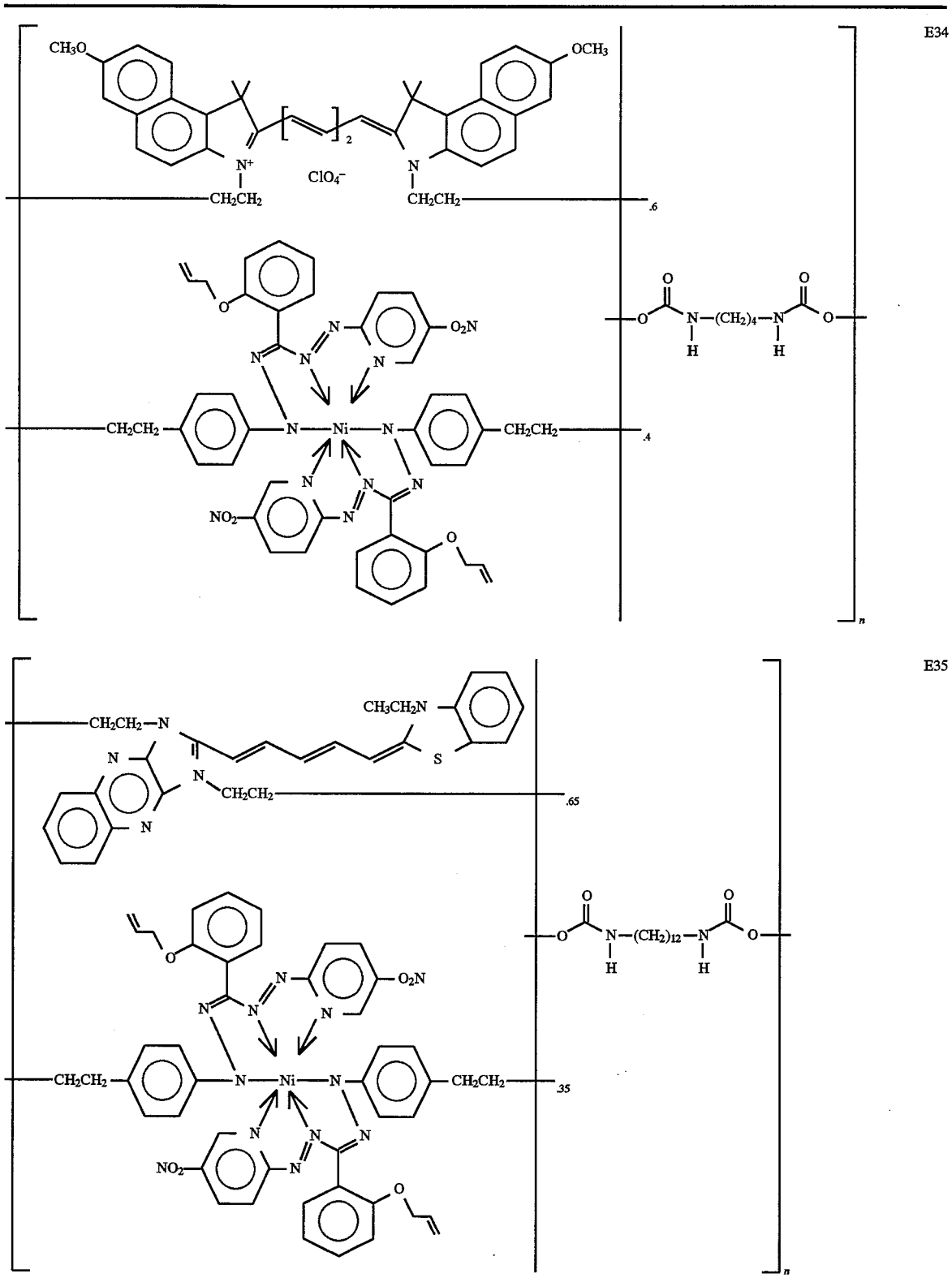

TABLE 1-continued
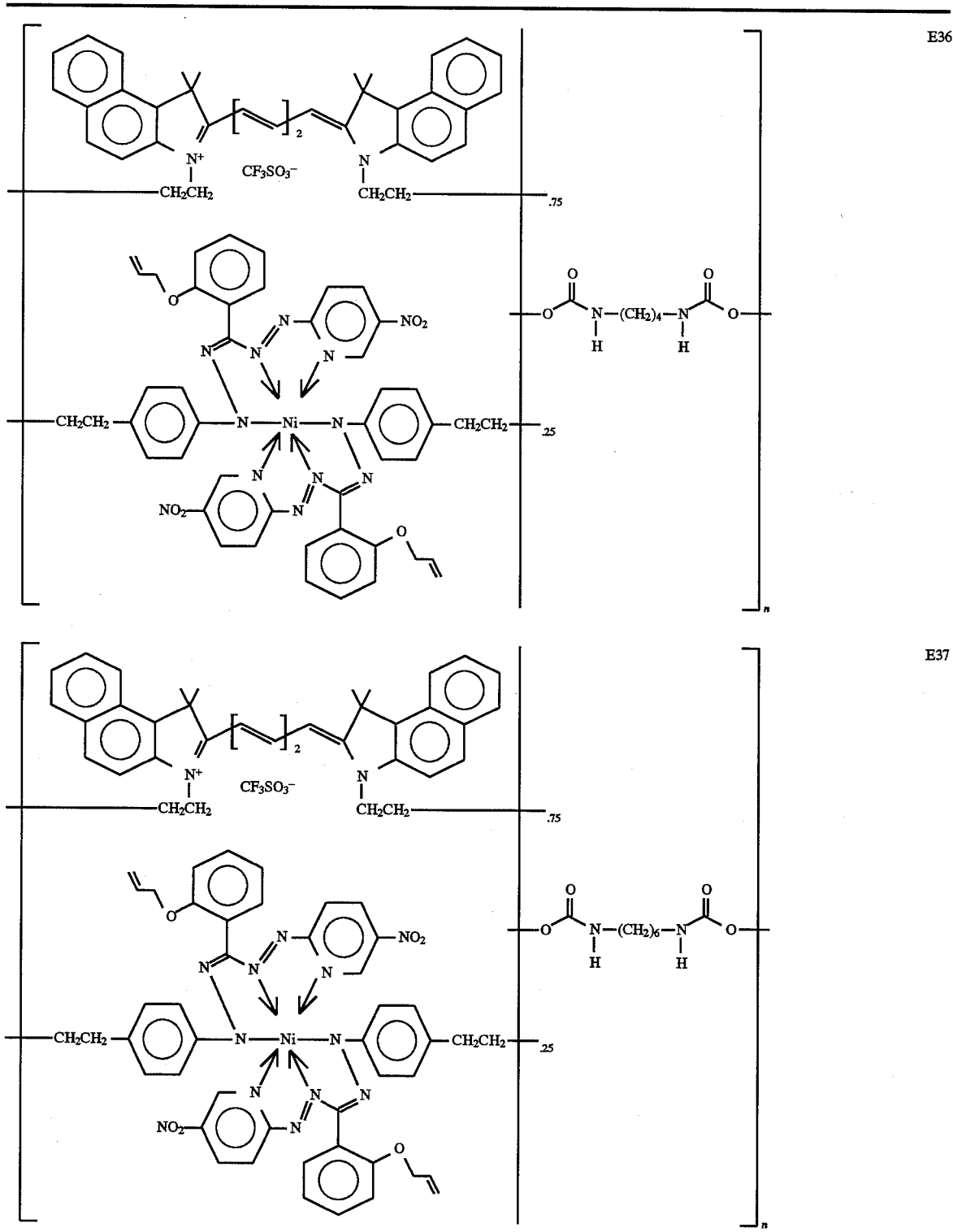

TABLE 1-continued

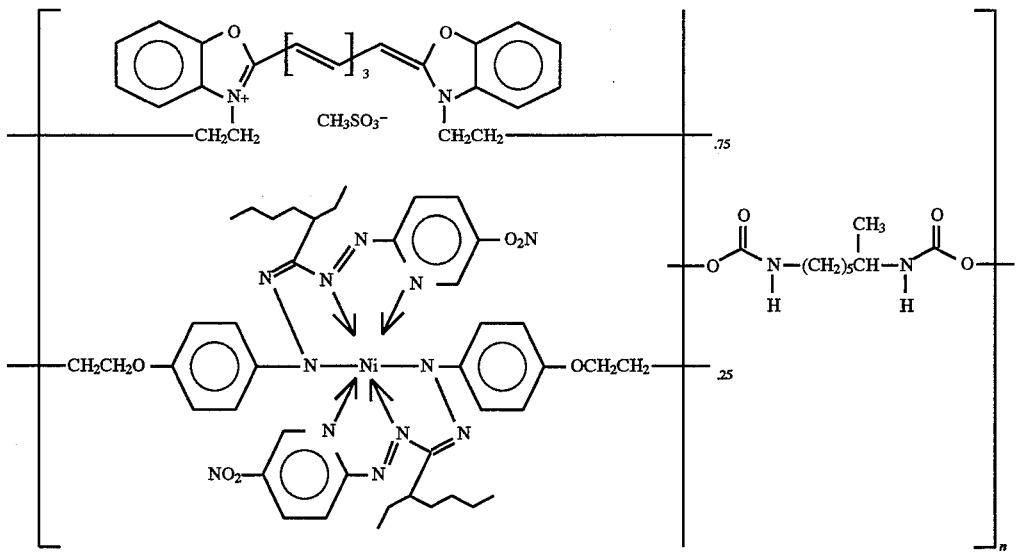

E38

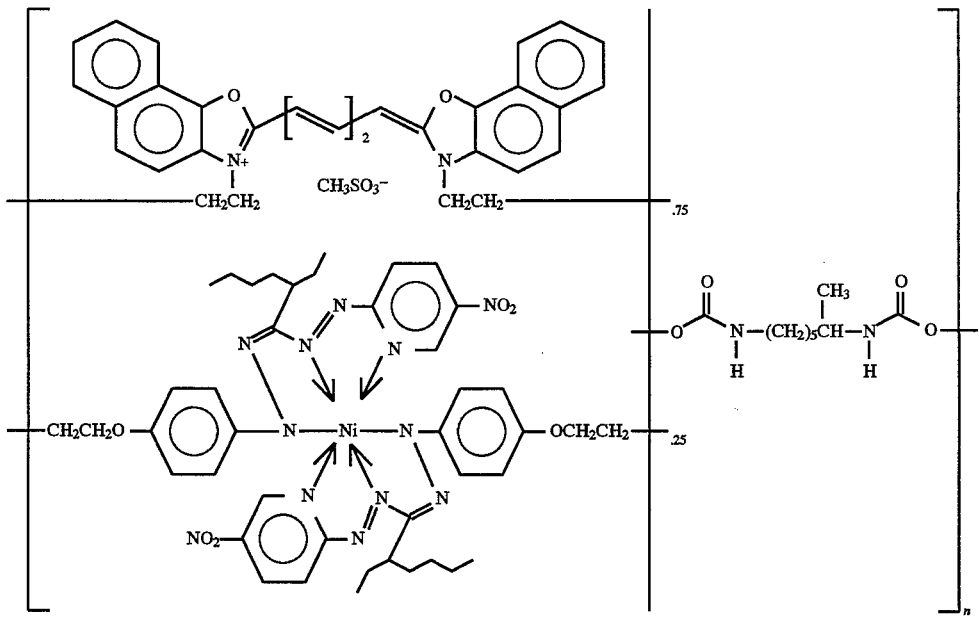

E39

The recording layer comprises copolymer of the invention. The recording layer may also include copolymers of the invention mixed with (a) other polymeric dyes, (b) other polymers, (c) other dyes, (c) binders and/or (d) other addenda which improves the coatability, stability and/or performance of optical recording layers and elements. It is preferred that the optical recording layer, between 775 nm and 800 nm, have a real refractive index (N) of no less than 1.8 and an imaginary index (k) of no greater than 0.3. Refractive indices, N and k, were measured using a variable angle spectroscopic ellipsometer manufactured by J. A. Woollam Company.

Preferred optical recording element comprises a light transmitting pregrooved (grooves being between 20 and 300 nm deep and 200 and 800 nm wide) substrate, an optical recording layer according to the invention, a light reflective layer overlaying the optical recording layer and a lacquer protective layer overlaying the light reflective layer. The recording process generates marks of lower reflectivity than the unmarked areas of the disk when written and read with a diode laser emitting between 775 and 800 nm The substrate may be any transparent material that satisfies the mechanical and optical requirements. Generally pregrooved with groove depths from 20 nm to 300 nm, groove widths of 200 to 1,000 nm and a pitch of 500 to 2,000 nm. The preferred material is polycarbonate, other materials are polymethylmethacrylate, glass and other suitable polymeric materials.

For the reflective layer the preferred material is gold, other materials are silver, copper, aluminum, platinum or other suitable metallic substance with sufficient reflectivity.

For the protective layer any commercial material that is used with regular CD disks can be used, such as Daicure SD-17™.

Optical Recording Layers and Elements

EXAMPLES 3–7 copolymer E1 in a recording layer.

A polycarbonate substrate having a thickness of 1.2 mm, and outer diameter of 120 mm and an inner diameter of 15 mm and having a pregrooved spiral surface with a width of 400 nm, and a depth of 80 nm and a pitch of 1,600 nm, was made by injection molding.

To form the recording layer, 1 part by weight of copolymeric dye E1 was dissolved in 40 parts of 2,2,3,3-tetrafluropropanol by volume with stirring for one hour at room temperature. The solution was filtered through a 0.2 mm filter, and coated on the surface of the substrate by spin coating to an overall optical density of 1.4 at 673 nm. It was dried at 80° C. for ten minutes.

Then a gold reflective layer was deposited by a resistive heating process on the entire surface of the element to about 120 nm thickness.

To protect the gold layer a lacquer (Daicure SD-17™) was applied by spin coating onto the gold layer to a thickness of 7 to 11 m and was UV cured with an "H" bulb using a Fusion System cure at 3000 W/inch power for 15 seconds.

To test the optical element thus obtained a test system consisting of an optical head with a 788 nm laser, a 0.5 NA lens, phase tracking, and ½ aperature focusing was used. The optics used circularly polarized light to reduce laser feedback effects. Recording and play back were carried out with the same laser at 2.8 m/s rotational speed. The read power was kept at 0.6 mW. Single frequency was recorded with about 3.5 mm mark length at 12 mW write power forming marks of lower reflectivity than the unmarked area when examined with a light source emitting a 788 nm light. When the marks were read the CNR (carrier signal to noise ratio), through 30 Kz filter, for copolymer E1 was 60 dB.

To test the cohesive strength of the light absorptive layer, a 90° peel test was performed on Scotch tape placed radially across the sputtered gold reflective layer of an unlacquered disk. The sputtered gold was deposited using the process of DC magnetron sputter deposition. The stainless steel chamber consists of a VAT gate valve which is directly ported to a turbo molecular pump. A Lesker Torus 10 sputter cathode with a gold target is bolted to one side of the VAT valve body. A loadlock door assembly is mounted to the other side of the valve body, and the substrates are introduced to the chamber through this assembly. The target to substrate spacing is 6 cm and the Advanced Energy power supply provides approximately 8.0 kW, @620 V, for 0.02 minutes at an Argon flow of 80 sccm. This results in a gold film thickness of nearly 60 nm.

Adhesion of the sputtered gold layer to the copolymeric dye recording layer is determined using the following peel test. This test is a version of the 90° peel test taken from Adhesion and Adhesives, Science and Technology (1990). A strip of Scotch tape (¾ inch wide, 3M brand #810) is placed radially along the disk on the surface of the layer with an excess of at least 40 mm extending past the outside diameter of the disk. The entire disk is clamped to a stage of an Instron Tensile testing apparatus. This stage is capable of moving vertical and horizontal. Vertical movement is controlled by an Instron tensile testing apparatus, and will be used to peel the layer from the coating. The horizontal movement is controlled by the operator, and used to keep the peel angle at 90°. The excess tape or leader is clamped to a load cell. The distance of the upper clamp from the disk is 40 mm. The stage is lowered at a rate of 1 inch (2.54 cm) per minute. The peel force is taken as the average measured force to peel the sputtered gold layer from the copolymeric dye recording layer per tape width.

To evaluate light stability, the dyes were spincoated on 2 by 2 inch polycarbonate slides. Optical density measurements were taken on the coated slides with a Hewlett Packard 8450A Diode Array spectrophotometer between 400 nm and 800 nm wavelengths. The slide was exposed through the polycarbonate for sixteen days by a method recommended by the Image Stability Technical Center for standard 50 klux Daylight exposure (ANSI IT9.9-1990 "Stability of Color Photographic Images" Section 5 Paragraph 5.6 Describes Simulated Indoor Indirect Daylight exposure). After sixteen days the optical densities were re-measured. To calculate the percent optical density loss of the dye coatings, from the optical density value measured at $\lambda_{max}$ before light exposure the optical density value at $\lambda_{max}$ after light exposure was subtracted, the resulting value was divided by the optical density value before light exposure and multiplied by one hundred.

Four additional elements were created using other copolymers from Table 1. The elements were tested as in Example 3. The results are presented in Table 2.

TABLE 2

| Ex. | Co-polymeric dye | $M_w^1 \times 10^{-3}$ | Indices, at 788 nm | Optical Density measured at 673 nm | CNR (dB)/ write power (mW) | light stability (% OD loss at lmax, 50 Klux, 16 days) | peel force (N/m) |
|---|---|---|---|---|---|---|---|
| 3 | E1 | 36 | 2.32–0.041i | 1.43 | 60/12 | 24 | |
| 4 | E7 | 23 | | 1.35 | 59/12 | 10 | 170 |
| 5 | E10 | 60 | | 1.3 | 59/11 | 25 | |
| 6 | E11 | 23 | 2.46–0.05i | 1.43 | 59/11 | 53 | 162 |
| 7 | E36 | 24 | 2.35–0.041i | 1.3 | 60/11 | 25 | 5.6 |

[1]Molecular weights were measured vs polymethylmethacrylate standards in N,N-dimethylformamide containing 0.01 M $LiNO_3$.

The invention has been described in detail with particular reference to preferred embodiments thereof, but it will be understood that variations and modifications can be effected within the spirit and scope of the invention.

We claim:

1. A copolymer comprising 70 to 100 mole percent of repeating units according to formula I:

$$-[(F-Z-W-Z)_f-(G-Z-W-Z)_g]_n- \quad I$$

wherein

F represents a divalent formazan dye radical derived from structure II:

[Structure II: formazan metal complex with substituents $(E_2)$, $(E_1)$, $(R_5)_s$, $R_6$, M, $(R_7)_t$]

wherein $E_1$ and $E_2$ represent the atoms necessary to complete a 5- or 6-membered heterocyclic ring such as pyridine and thiazole which may bear fused aromatic rings such as phenyl or heteroaromatic rings such as pyridine, and pyrazine;

$R_5$ represents hydrogen, $C_1$–$C_{20}$ alkyl, $C_6$–$C_{10}$ aryl, $C_7$–$C_{30}$ aralkyl, heteroaryl such as pyridyl, $C_2$–$C_{20}$ alkenyl; alkoxy, $C_1$–$C_{10}$ alkoxycarbonyl, $C_6$–$C_{10}$ aryloxy, $C_6$–$C_{10}$ aryloxycarbonyl, carbamyl, sulfamoyl, $C_1$–$C_{10}$ acylamino, sulfonylamino, halogen, ureido, hydroxy, carbamoyloxy, $C_1$–$C_{10}$ alkoxycarbonylamino, nitro, cyano, thiocyano, and carboxy;

$R_6$ represents $C_1$–$C_{20}$ alkyl, heterocyclic such as pyridyl, an aromatic ring such as phenyl, $C_1$–$C_{10}$ alkoxyphenyl, $C_1$–$C_{10}$ alkylphenyl, and $C_1$–$C_{10}$ alkoxycarbonylphenyl;

$R_7$ represents a substituent defined for $R_5$ above;

M represents a complexing metal ion such as nickel, palladium, and zinc; and s and t represent integers from 0 to 4;

G represents a divalent radical derived from a cyanine dye of structure III:

[Structure III: cyanine dye with B, $R_3$, $B_1$, D, $D_1$, N, R, $R_1$, X⁻, $-CH=C-(_m)-CH=$]

wherein

D and $D_1$ represent sufficient atoms to form a fused substituted or unsubstituted aromatic ring such as phenyl, naphthyl; and heterocyclic ring such as pyridyl;

B and $B_1$ represent —O—, —S—, >C(CH$_3$)$_2$, —Se—, —CH=CH—, $$-\underset{E}{\overset{}{N}}-$$

in which E represents an substituted or unsubstituted $C_1$ to $C_{10}$ alkyl and an aromatic ring such as phenyl and naphthyl; or B may combine with D, or $B_1$ may combine with $D_1$, to form fused aromatic rings;

R and $R_1$ represent $C_1$ to $C_{10}$ alkyl and $C_7$ to $C_{20}$ arylalkyl such as benzyl and phenethyl;

$R_3$ represents hydrogen, $C_1$ to $C_{10}$ alkyl, $C_7$ to $C_{20}$ arylalkyl such as benzyl and phenethyl; and halogen such chlorine and bromine;

X represents a anionic counter ion selected from

[Structure: bracketed anion with $R_4$ substituted phenyl and N(O)(O) group, subscript 3]

$R_4$ represents hydrogen, $C_1$ to $C_{10}$ alkyl, $C_1$ to $C_{10}$ alkoxy, and halogen such as chlorine, bromine and fluorine; $R_4$ represents the atoms necessary to form a fused aromatic ring;

m represents an integer from 1 to 2;

W represents $C_2$–$C_{18}$-alkylene; $C_3$–$C_8$-cycloalkylene; $C_1$–$C_4$ alkylene bonded to $C_3$–$C_8$ cycloalkylene bonded to $C_1$–$C_4$ alkylene; $C_1$–$C_4$ alkylenearylene bonded to $C_1$–$C_4$ alkylene; $C_2$–$C_4$ alkoxy bonded to $C_2$–$C_4$ alkylene; arylene bonded to $C_1$–$C_4$ alkylene bonded to arylene; and $C_3$–$C_8$ cycloalkylene bonded to $C_1$–$C_4$-alkylene bonded to $C_3$–$C_8$ cycloalkylene;

Z represents a divalent radical derived from carbonate, urethane, urea, ester; or amide;

f represents 10 to 65 mole percent of the repeating unit and g represents the remainder of the repeating unit;

n represents the repeating units needed to build a copolymer chain of a size that corresponds to a polymethylmethacrylate chain of weight average molecular weight ($M_w$) of 5,000 to 1,000,000.

2. A copolymer of claim 1 wherein structure II has the formula IV:

[Structure IV: formazan metal complex similar to II with pyridine rings, $(R_5)_s$, $R_6$, M, $(R_7)_t$]

$R_5$ represents hydrogen, nitro, 1-methyl-2-methoxyethylsulfamoyl, diisopropylsulfamoyl, t-butylsulfamoyl, methoxy, ethoxy;

R₆ represents ethoxyphenyl, ortho-allyloxyphenyl, 1-ethylpentyl, ethylphenyl, phenyl, ortho-methoxyphenyl;

R₇ represents sec-butyl, N-ethyl-N-propylsulfamoyl, ethyl, carboxyethyl, n-heptyl, allyl, ethoxy; and s and t each represent an integer from 0 to 2.

3. A polymer according to claim 1 or 2 wherein:

D and D₁ represent napthyl, phenyl, quinoxalyl, methoxynapthyl, ethoxynapthyl, methylphenyl;

B and B₁ represent —O—, —S—, dibutylmethylene, dimethylmethylene, ethylamino; or B combined with D, and B₁ combined with D₁, to form naphthyl;

R and R₁ represent ethyl, propyl, butyl, benzyl, phenethyl;

R₃ represents hydrogen;

X represents a anionic counter ion selected from

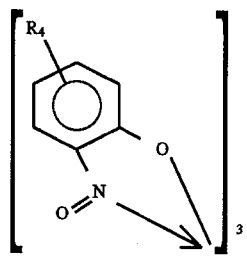

R₄ combines with phenyl to form napthyl;

m represents an integer of 2.

4. A copolymer selected from any copolymer from Table 1.

5. A copolymer according to claim 4 selected from copolymers E1, E7, E10, E11 and E36.

6. An optical recording element comprising an optical recording layer containing a copolymer having from 70 to 100 mole percent repeating units according to formula I:

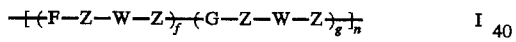

wherein:

F represents a divalent formazan dye radical derived from structure II:

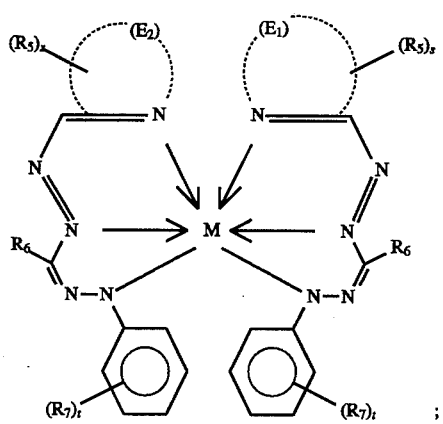

wherein

E₁ and E₂ represent the atoms necessary to complete a 5- or 6-membered heterocyclic ring such as pyridine and thiazole which may bear fused aromatic rings such as phenyl or heteroaromatic rings such as pyridine, and pyrazine;

R₅ represents hydrogen, C₁–C₂₀ alkyl, C₆–C₁₀ aryl, C₇–C₃₀ aralkyl, heteroaryl such as pyridyl, C₂–C₂₀ alkenyl; alkoxy, C₁–C₁₀ alkoxycarbonyl, C₆–C₁₀ aryloxy, C₆–C₁₀ aryloxycarbonyl, carbamyl, sulfamoyl, C₁–C₁₀ acylamino, sulfonylamino, halogen, ureido, hydroxy, carbamoyloxy, C₁–C₁₀ alkoxycarbonylamino, nitro, cyano, thiocyano, and carboxy;

R₆ represents C₁–C₂₀ alkyl, heterocyclic such as pyridyl, an aromatic ring such as phenyl, C₁–C₁₀ alkoxyphenyl, C₁–C₁₀ alkylphenyl, and C₁–C₁₀ alkoxycarbonylphenyl;

R₇ represents a substituent defined for R₅ above;

M represents a complexing metal ion such as nickel, palladium, and zinc; and s and t represent integers from 0 to 4;

G represents a divalent radical derived from a cyanine dye of structure III:

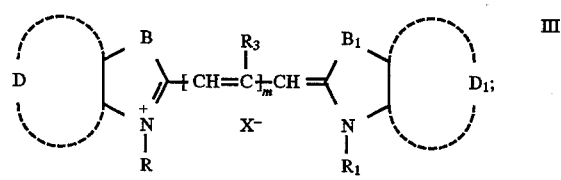

wherein

D and D₁ represent sufficient atoms to form a fused substituted or unsubstituted aromatic ring such as phenyl, naphthyl; and heterocyclic ring such as pyridyl;

B and B₁ represent —O—, —S—, >C(CH₃)₂, —Se—, —CH=CH—,

in which E represents an substituted or unsubstituted C₁ to C₁₀ alkyl and an aromatic ring such as phenyl and naphthyl; or B may combine with D, or B₁ may combine with D₁, to form fused aromatic rings;

R and R₁ represent C₁ to C₁₀ alkyl and C₇ to C₂₀ arylalkyl such as benzyl and phenethyl;

R₃ represents hydrogen, C₁ to C₁₀ alkyl, C₇ to C₂₀ arylalkyl such as benzyl and phenethyl; and halogen such chlorine and bromine;

X represents a anionic counter ion selected from

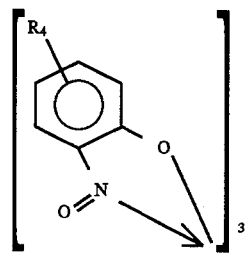

R₄ represents hydrogen, C₁ to C₁₀ alkyl, C₁ to C₁₀ alkoxy, and halogen such as chlorine, bromine and fluorine; R₄ represents the atoms necessary to form a fused aromatic ring;

m represents an integer from 1 to 2;

W represents C₂–C₁₈-alkylene; C₃–C₈-cycloalkylene; C₁–C₄ alkylene bonded to C₃–C₈ cycloalkylene bonded to $C_1$–$C_4$ alkylene; $C_1$–$C_4$ alkylenearylene bonded to $C_1$–$C_4$ alkylene; $C_2$–$C_4$ alkoxy bonded to $C_2$–$C_4$ alkylene; arylene bonded to $C_1$–$C_4$ alkylene bonded to arylene; and $C_3$–$C_8$ cycloalkylene bonded to $C_1$–$C_4$-alkylene bonded to $C_3$–$C_8$ cycloalkylene;

Z represents a divalent radical derived from carbonate, urethane, urea, ester; or amide;

f represents 10 to 65 mole percent of the repeating unit and g represents the remainder of the repeating unit;

n represents the repeating units needed to build a copolymer chain of a size that corresponds to a polymethylmethacrylate chain of weight average molecular weight ($M_w$) of 5,000 to 1,000,000.

7. An optical recording element according to claim 6 wherein the copolymer has a real index (N) of >1.8 and an imaginary index (k) from 0.005 to 0.3 from 775 nm to 790 nm.

8. An optical recording element according to claim 6 comprising, in the following order:

(a) a transparent support;

(b) an optical recording layer having a real index (N) of >1.8 and an imaginary index (k) from 0.005 to 0.3 from 775 nm to 790 nm; and (c) a metal reflective layer.

* * * * *